(12) United States Patent
Collins et al.

(10) Patent No.: US 11,030,239 B2
(45) Date of Patent: Jun. 8, 2021

(54) AUDIO BASED ENTITY-ACTION PAIR BASED SELECTION

(71) Applicant: GOOGLE LLC, Mountain View, CA (US)

(72) Inventors: Alexander Collins, San Francisco, CA (US); Ian James Leader, Zurich (CH); Yunkai Zhou, Sewickley, PA (US); Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/584,746

(22) Filed: May 2, 2017

(65) Prior Publication Data

US 2018/0225375 A1 Aug. 9, 2018

Related U.S. Application Data

(63) Continuation-in-part of application No. 15/395,689, filed on Dec. 30, 2016, and a continuation-in-part of (Continued)

(51) Int. Cl.
| | |
|---|---|
| *G06F 17/30* | (2006.01) |
| *G06F 16/632* | (2019.01) |
| *G10L 15/08* | (2006.01) |
| *G10L 25/54* | (2013.01) |
| *G06F 16/951* | (2019.01) |
| *G06F 16/9032* | (2019.01) |

(52) U.S. Cl.
CPC ........ *G06F 16/632* (2019.01); *G06F 16/9032* (2019.01); *G06F 16/951* (2019.01); *G10L 15/08* (2013.01); *G10L 25/54* (2013.01); *G10L 2015/088* (2013.01)

(58) Field of Classification Search
CPC combination set(s) only.
See application file for complete search history.

(56) References Cited

U.S. PATENT DOCUMENTS

| | | | |
|---|---|---|---|
| 5,418,713 A | 5/1995 | Allen | |
| 5,498,002 A | 3/1996 | Gechter | |
| (Continued) | | | |

FOREIGN PATENT DOCUMENTS

| | | |
|---|---|---|
| EP | 0 408 348 A2 | 1/1991 |
| JP | 2007-072712 A | 3/2007 |
| (Continued) | | |

OTHER PUBLICATIONS

"Amazon and Google Want to Turn Their Smart Home Speakers Into Telephone Replacements—Mac Rumors" MacRumors, 9 pages.
(Continued)

*Primary Examiner* — Khanh B Pham
(74) *Attorney, Agent, or Firm* — Foley & Lardner LLP

(57) ABSTRACT

Routing packetized actions in a voice activated data packet based computer network environment is provided. A system can receive audio signals detected by a microphone of a device. The system can parse the audio signal to identify trigger keyword and request, and generate an action data structure. The action data structure can include digital components and entity-action pairs.

20 Claims, 10 Drawing Sheets

Related U.S. Application Data application No. 13/932,836, filed on Jul. 1, 2013, now Pat. No. 9,953,085.

(60) Provisional application No. 61/829,634, filed on May 31, 2013.

(56) References Cited

U.S. PATENT DOCUMENTS

| | | |
|---|---|---|
| 5,572,643 A | 11/1996 | Judson |
| 5,602,565 A | 2/1997 | Takeuchi |
| 5,634,850 A | 6/1997 | Kitahara et al. |
| 5,682,511 A | 10/1997 | Sposato et al. |
| 5,748,173 A | 5/1998 | Gur |
| 5,774,664 A | 6/1998 | Hidary et al. |
| 5,778,181 A | 7/1998 | Hidary et al. |
| 5,831,591 A | 11/1998 | Suh |
| 5,845,263 A | 12/1998 | Camaisa et al. |
| 5,856,821 A | 1/1999 | Funahashi |
| 6,011,537 A | 1/2000 | Slotznick |
| 6,018,768 A | 1/2000 | Ullman et al. |
| 6,026,373 A | 2/2000 | Goodwin, III |
| 6,185,558 B1 | 2/2001 | Bowman et al. |
| 6,199,060 B1 | 3/2001 | Gustman |
| 6,275,806 B1 | 8/2001 | Pertrushin |
| 6,320,602 B1 | 11/2001 | Burkardt et al. |
| 6,505,169 B1 | 1/2003 | Bhagavath et al. |
| 6,510,553 B1 | 1/2003 | Hazra |
| 6,570,587 B1 | 5/2003 | Efrat et al. |
| 6,591,247 B2 | 7/2003 | Stern |
| 6,642,940 B1 | 11/2003 | Dakss et al. |
| 6,684,249 B1 | 1/2004 | Frerichs et al. |
| 6,823,495 B1 | 11/2004 | Vedula et al. |
| 6,857,007 B1 | 2/2005 | Bloomfield |
| 6,947,531 B1 | 9/2005 | Lewis et al. |
| 7,124,101 B1 | 10/2006 | Mikurak |
| 7,158,676 B1 | 1/2007 | Rainsford |
| 7,526,786 B1 | 4/2009 | Adams et al. |
| 7,647,242 B2 | 1/2010 | Bem |
| 7,660,815 B1 | 2/2010 | Scofield et al. |
| 7,668,821 B1 | 2/2010 | Donsbach et al. |
| 7,831,472 B2 | 11/2010 | Yufik |
| 7,853,255 B2 | 12/2010 | Karaoguz et al. |
| 7,979,459 B2 | 7/2011 | Wu et al. |
| 8,065,611 B1 | 11/2011 | Chan et al. |
| 8,073,868 B2 | 12/2011 | Lavi |
| 8,108,253 B2 | 1/2012 | Poon et al. |
| 8,126,766 B2 | 2/2012 | Alexander |
| 8,135,619 B2 | 3/2012 | Bem |
| 8,195,133 B2 | 6/2012 | Ramer et al. |
| 8,301,499 B2 | 10/2012 | Moissinac et al. |
| 8,386,386 B1 | 2/2013 | Zhu |
| 8,391,618 B1 | 3/2013 | Chuang et al. |
| 8,463,783 B1 | 6/2013 | Yagnik |
| 8,583,471 B1 | 11/2013 | Voskuhl et al. |
| 8,688,514 B1 | 4/2014 | Sarkar et al. |
| 8,903,716 B2 | 12/2014 | Chen et al. |
| 9,189,514 B1 | 11/2015 | Myslinski |
| 9,304,738 B1 | 4/2016 | Xu et al. |
| 9,535,887 B2 | 1/2017 | Ozgul |
| 9,875,740 B1* | 1/2018 | Kumar .................. G10L 15/30 |
| 9,959,129 B2 | 5/2018 | Kannan et al. |
| 10,056,078 B1* | 8/2018 | Shepherd .............. G10L 15/26 |
| 10,068,573 B1* | 9/2018 | Aykac .................. G10L 15/22 |
| 10,276,170 B2 | 4/2019 | Gruber et al. |
| 10,417,037 B2 | 9/2019 | Gruber et al. |
| 2002/0032603 A1 | 3/2002 | Yeiser |
| 2002/0045988 A1 | 4/2002 | Yokota |
| 2002/0053078 A1 | 5/2002 | Holtz et al. |
| 2002/0065722 A1 | 5/2002 | Hubbard et al. |
| 2002/0133571 A1 | 9/2002 | Jacob et al. |
| 2003/0018541 A1 | 1/2003 | Nohr |
| 2003/0028873 A1 | 2/2003 | Lemmons |
| 2003/0033161 A1 | 2/2003 | Walker et al. |
| 2003/0040957 A1 | 2/2003 | Rodriguez et al. |
| 2003/0074662 A1 | 4/2003 | Istvan et al. |
| 2004/0044569 A1 | 3/2004 | Roberts et al. |
| 2004/0260621 A1 | 12/2004 | Foster et al. |
| 2005/0125683 A1 | 6/2005 | Matsuyama et al. |
| 2005/0138016 A1 | 6/2005 | Matsuyama et al. |
| 2005/0187823 A1 | 8/2005 | Howes |
| 2005/0188400 A1 | 8/2005 | Topel |
| 2005/0220439 A1 | 10/2005 | Carton et al. |
| 2005/0261968 A1 | 11/2005 | Randall et al. |
| 2005/0288096 A1 | 12/2005 | Walker et al. |
| 2006/0004627 A1 | 1/2006 | Baluja |
| 2006/0064411 A1 | 3/2006 | Gross et al. |
| 2006/0247999 A1 | 11/2006 | Gonen et al. |
| 2006/0293995 A1 | 12/2006 | Borgs et al. |
| 2007/0094042 A1 | 4/2007 | Ramer et al. |
| 2007/0094081 A1 | 4/2007 | Yruski et al. |
| 2007/0097975 A1 | 5/2007 | Rakers et al. |
| 2007/0123222 A1 | 5/2007 | Cox et al. |
| 2007/0127688 A1 | 6/2007 | Doulton |
| 2007/0174258 A1 | 7/2007 | Jones et al. |
| 2007/0288309 A1 | 12/2007 | Haberman et al. |
| 2008/0021953 A1 | 1/2008 | Gil |
| 2008/0060001 A1 | 3/2008 | Logan et al. |
| 2008/0066107 A1 | 3/2008 | Moonka et al. |
| 2008/0086368 A1 | 4/2008 | Bauman et al. |
| 2008/0091537 A1 | 4/2008 | Miller et al. |
| 2008/0107404 A1 | 5/2008 | Nakamura et al. |
| 2008/0109306 A1 | 5/2008 | Maigret et al. |
| 2008/0120276 A1 | 5/2008 | Chennavasin |
| 2008/0172422 A1 | 7/2008 | Li et al. |
| 2008/0187279 A1 | 8/2008 | Gilley et al. |
| 2008/0201220 A1 | 8/2008 | Broder et al. |
| 2008/0235087 A1 | 9/2008 | Amento et al. |
| 2008/0243821 A1 | 10/2008 | Delli Santi et al. |
| 2008/0263583 A1 | 10/2008 | Heath |
| 2008/0268876 A1 | 10/2008 | Gelfand et al. |
| 2008/0270538 A1 | 10/2008 | Garg et al. |
| 2008/0281684 A1 | 11/2008 | Stefanik et al. |
| 2008/0319844 A1 | 12/2008 | Hua et al. |
| 2009/0163227 A1 | 6/2009 | Collins |
| 2009/0179900 A1 | 7/2009 | Petrovic et al. |
| 2009/0254971 A1 | 10/2009 | Herz et al. |
| 2009/0265236 A1 | 10/2009 | Schultz et al. |
| 2009/0307013 A1 | 12/2009 | Altounian et al. |
| 2009/0324107 A1 | 12/2009 | Walch |
| 2010/0094686 A1 | 4/2010 | Henshaw et al. |
| 2010/0104145 A1 | 4/2010 | Momosaki |
| 2010/0111196 A1 | 5/2010 | Lynch et al. |
| 2010/0287056 A1 | 11/2010 | Koningstein et al. |
| 2011/0161130 A1 | 6/2011 | Whalin et al. |
| 2011/0208822 A1 | 8/2011 | Rathod |
| 2011/0238500 A1 | 9/2011 | Kim |
| 2011/0246027 A1 | 10/2011 | Miyajima |
| 2011/0246285 A1 | 10/2011 | Ratnaparkhi et al. |
| 2011/0295847 A1 | 12/2011 | Cucerzan et al. |
| 2012/0054015 A1 | 3/2012 | Wu |
| 2012/0059713 A1 | 3/2012 | Galas et al. |
| 2012/0072280 A1 | 3/2012 | Lin |
| 2012/0095828 A1 | 4/2012 | Evankovich et al. |
| 2012/0105868 A1 | 5/2012 | Nomura et al. |
| 2012/0150657 A1 | 6/2012 | Rubinstein et al. |
| 2012/0159620 A1 | 6/2012 | Seifert et al. |
| 2012/0224768 A1 | 9/2012 | Lee |
| 2012/0265528 A1 | 10/2012 | Gruber et al. |
| 2012/0265761 A1 | 10/2012 | Atsmon et al. |
| 2013/0117022 A1 | 5/2013 | Chen et al. |
| 2013/0120544 A1 | 5/2013 | Du et al. |
| 2013/0268507 A1 | 10/2013 | MacBeth et al. |
| 2013/0272570 A1 | 10/2013 | Sheng et al. |
| 2013/0275164 A1 | 10/2013 | Gruber et al. |
| 2013/0290172 A1 | 10/2013 | Mashinsky |
| 2013/0304758 A1 | 11/2013 | Gruber et al. |
| 2013/0318089 A1 | 11/2013 | Tan et al. |
| 2014/0278411 A1 | 9/2014 | Cheung |
| 2014/0278528 A1 | 9/2014 | Simha et al. |
| 2014/0280015 A1 | 9/2014 | Marantz et al. |
| 2014/0324851 A1 | 10/2014 | Tholiya et al. |
| 2014/0351241 A1 | 11/2014 | Leask et al. |
| 2014/0351261 A1 | 11/2014 | Aswani et al. |
| 2015/0161147 A1 | 6/2015 | Zhao et al. |

(56) References Cited

U.S. PATENT DOCUMENTS

| | | | |
|---|---|---|---|
| 2015/0199731 | A1 | 7/2015 | Jevtic et al. |
| 2015/0227504 | A1 | 8/2015 | Zhang et al. |
| 2015/0256633 | A1 | 9/2015 | Chand et al. |
| 2015/0278878 | A1 | 10/2015 | Chau |
| 2015/0370914 | A1 | 12/2015 | Carroll et al. |
| 2016/0063106 | A1 | 3/2016 | Chai et al. |
| 2016/0104212 | A1 | 4/2016 | Saligrama Ananthanarayana et al. |
| 2016/0210689 | A1 | 7/2016 | Hummel |
| 2016/0212455 | A1 | 7/2016 | Manna |
| 2017/0024766 | A1 | 1/2017 | Thomson et al. |
| 2017/0061515 | A1 | 3/2017 | Hummel |
| 2017/0076316 | A1 | 3/2017 | Heffernan et al. |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0178686 | A1 | 6/2017 | Li et al. |
| 2017/0323230 | A1 | 11/2017 | Bailey et al. |
| 2017/0358301 | A1 | 12/2017 | Raitio et al. |
| 2018/0040020 | A1 | 2/2018 | Kurian et al. |
| 2018/0097940 | A1 | 4/2018 | Beilis et al. |
| 2018/0277113 | A1* | 9/2018 | Hartung .................. G10L 15/22 |
| 2018/0300745 | A1 | 10/2018 | Aubespin et al. |

FOREIGN PATENT DOCUMENTS

| | | |
|---|---|---|
| JP | 2009-048446 A | 3/2009 |
| JP | 2015-528140 | 9/2015 |
| KR | 10-2000-0017807 A | 4/2000 |
| WO | WO-02/37470 | 5/2002 |
| WO | WO-02/080555 A2 | 10/2002 |
| WO | WO-2011/088053 A2 | 7/2011 |
| WO | WO-2018/125299 A1 | 7/2018 |

OTHER PUBLICATIONS

"Apple Patent Reveals a New Security Feature Coming to Siri" 6 pages.

"Introducing Echo Look Hands-Free Camera and Style Assistant" 1996-2017, Amazon.com, Inc. 5 pages.

"The Patent Behind Google Home's New Feature of Understanding Different Voices in the Home Surfaced Today", Apr. 20, 2017, 5 pages.

Close, "Amazon Echo Will Give You These Deals If You Order Through Alexa This Weekend," Web Article, Nov. 18, 2016, Time.com (2 pages).

Collins, Terry "Can Twitter Save itself? The Social Network is Slowly gaining users, but still Lags Far Behind Rivals. Is a Turnaround Possible?" 3 pages.

Cook, "A Siri for advertising: These mobile ads talk back to you," Web Article, Apr. 1, 2013, Geekwire.com (7 pages).

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

Golgowski, Nina, "This Burger King Ad Is Trying to Control Your Google Home Device", Apr. 12, 2017, 7 pages.

Google Inc., Products Feed Specification, printed from Internet address: http://www.support.google.com/merchants/bin/answer.py?hl=en&answer=188494#US, on Mar. 18, 2013, 6 pages.

Google Inc., Supported File Formats, printed from Internet address: http://www.support.google.com/merchants/bin/answer.py?hl=en&answer=160567, on Mar. 18, 2013, 1 page.

Larson, Selena "Google Home Now Recognizes your Individual Voice" dated Apr. 20, 2017, 3 pages.

Lund, Pamela, Mastering Google Product Feeds and Product Listing Ads—Part 1, found at http://www.blueglass.com/blog/mastering-google-product-feeds-and-product-listing-ads-part-1/#comments, 17 pages.

Nieva, Richard, "Google Home and eBay can tell you how much that's worth", 3 pages.

Purcher, Jack "Today Google Home's Virtual Assistant Can Learn its Owner's Voice for Security Reason's like Apple's Patent Pending Idea" Apr. 20, 2017, 4 pages.

Seifert, Dan "Samsung's New Virtual Assistant Will Make Using Your Phone Easier", Mar. 20, 2017, 7 pages.

Sherr, Ian "IBM Built a Voice Assistant For Cybersecurity" dated Feb. 13, 2017, 4 pages.

Siegal, Daniel, "IP Attys Load Up Apps' Legal Challenges At 'Silicon Beach" 6 pages.

Simonite, "How Alexa, Siri, and Google Assistant Will Make Money Off You," Web Article, May 31, 2016, technologyreview.com (11 pages).

Simonite, "How Assistant Could End Up Eating Google's Lunch," Web Article, Sep. 23, 2016, technologyreview.com (9 pages).

U.S. Office Action on 098981-0773 dated Jun. 24, 2015.

U.S. Office Action on U.S. Appl. No. 13/932,836, dated Feb. 12, 2015, 10 pgs.

U.S. Office Action on U.S. Appl. No. 13/932,836 dated Apr. 12, 2017.

U.S. Office Action on U.S. Appl. No. 13/932,836 dated Nov. 2, 2016.

U.S. Office Action on U.S. Appl. No. 13/932,836 dated Nov. 16, 2015.

U.S. Office Action on U.S. Appl. No. 13/932,836 dated Jul. 8, 2016.

"CrunchBase ScanScout," [online] [Retrieved on Mar. 11, 2011]; Retrieved from the Internet URL: http://www.crunchbase.com/company/ScanScout; 3 pages.

"Introducing Adap.tv for Advertisers," [online][Retrieved on Mar. 11, 2011]; Retrieved from the internet URL: http://www.adap.tv/demo.html; 1 page.

"MeToday Jul. 4, 2007," [online] [Retrieved on Mar. 11, 2011]; Retrieved from the Internet, URL: http://www.viddler.com/explore/djsteen/videos/27/; 1 page.

"Ooyala Blog: Create the Group," [online][Retrieved on Mar. 11, 2011]; Retrieved from the Internet URL: http//www.ooyala.com/blog; 11 pages.

"Walmart and Google to offer voice-enabled shopping", BBC News, Aug. 23, 2017.

"What's Hot on Shopping.com," [online][Retrieved on Mar. 11, 2011]; Retrieved from the Internet URL; shopping.com; 2 pages.

Anonymous, "Microsoft for Digital Advertising Industry", PR Newswire, New York, Jan. 13, 2006, pp. 1-4. ProQuest Document ID 968489271.

Arrington, Michael, "Hutu Makes First Acquisition; Chinese Video Startup To Form Backbone of New Service," [online] [Retrieved on Mar. 11, 2011]; Retrieved from the Internet URL: http://www.techcrunch.com/2007/09/12/hulu-makes-first-acquisition-chinese-video-startup-to-form-backbone-of-new-service/; 6 pages.

Arrington, Michael, "TechCrunch—AdBrite Makes Brilliant Video Product," [online][Retrieved on Mar. 11, 2011]; Retrieved from the Internet URL: http://www.techcrunch.com/2007/1/4/adbrite-makes-brilliant-video-product; 12 pages.

Arrington, Michael, "TechCrunch—Cisco and Click.tv?," [online][Retrieved on Mar. 11, 2011]; Retrieved from the Internet URL: http;//www.techcrunch.com/2007/07/30/cisco-and-clicktv/; 4 pages.

Arrington, Michael, "TechCrunch—Click.tv Moves Video Ideas Forward," [online][Retrieved on Mar. 11, 2011] Retrieved from the Internet URL: http://www.techcrunch.com/2006/04/16/clicktv-moves-video-ideas-forward/; 6 pages.

Arrington, Michael, "TechCrunch—FuckedCompany's Adbrite Spawn Goes 2.0," [online][Retrieved on Mar. 11, 2011]; Retrieved from the Internet URL: http://www.techcrunch.com/2007/01/04/adbrite-makes-brilliant-video-product; 5 pages.

Asterpix Interactive Video, 'Introducing Hypervideo', [online] [retrieved on Nov. 26, 2007]. Retrieved from http://www.asterpix.com/help/learnmore/introducing/.

Broussard, Mitchel, "Chatbot-Like Siri Patent Includes Intelligent Image, Video, and Audio Recognition Within Messages", May 11, 2017, 11 pages.

(56) References Cited

OTHER PUBLICATIONS

Chen, Yilun Lulu, "Alibaba Challenges Google, Amazon With New Echo-Like Device", Bloomberg, Jul. 5, 2017, 3 pages.
Crist, Ry, "Logitech Harmony's Alexa Skill just got a whole lot better", cnet, Jul. 13, 2017 (2 pages).
CrunchBase Company Profile, 'ScanScout', Jul. 24, 2007 [online][retrieved on Nov. 26, 2007]. Retrieved from http://www.crunchbase.com/company/ScanScout.
Dominguez, C., 'BroadRamp technology will make TV shows virtual mall', San Antonio Business Journal, Jun. 11, 2007, [online] [retrieved on Nov. 26, 2007]. Retrieved from http://cincinnati.bizjournals.com/sanantonio/stories/2007/06/11story2.html?t=printable.
Dominguez, Catherine, "BroadRamp technology will make TV shows virtual mall", San Antonio Business Journal, The Essential Business Tool, Jun. 11, 2007, pp. 1-3, http://sanantonio.bizjournals.com/sanantonio/stories/2007/06/11/story3.html.
Dominguez, Catherine, "BroadRamp technology will make TV shows virtual mall." [online][Retrieved on Mar. 16, 2011]; Retrieved from the Internet URL: http//www.bizjournals.com/sanantonio/stories/2007/06/11/sotry3.html; 3 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Gonzalez, Nick, "TechCrunch—Video Ads: Every Startup Has a Different Solution," [online][Retrieved on Mar. 11, 2011]; Retrieved from the Internet URL: http://www.techcrunch.com/2007/07/06/video-ads-somebody-needs-to-solve-this-problem/; 8 pages.
Gonzalez, Nick, "TechCrunch—YuMe Closes $9 Million Series B," [online] [Retrieved on Mar. 16, 2011]: Retrieved from the Internet URL: http://techcrunch.com/2007/10/16/yume-closes-9-million-series-b/; 1 page.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Hendrickson, Mark, "TechCrunch—Time Warner Invests in Video Ads Startup ScanScout,", [online] [Retrieved on Mar. 11, 2011]; Retrieved from the Internet URL: http://www.techcrunch.com/2007/09/09/time-warner-backs-video-ads-through=scanscout/; 6 pages.
International Preliminary Report on Patentablity for PCT/US2008/084982 dated Jun. 10, 2010, 5 pages.
International Search Report and Written Opinion on PCT Application PCT/US2008/84982, dated Jun. 23, 2009, 8 pages.
Kelion, Leo, "Amazon's race to make Alexa smarter", BBC News, Jul. 28, 2017 (8 pages).
Koetsier, John, "Ads On Amazon Echo: Wendy's, ESPN, And Progressive Among Brands Testing", Forbes, May 11, 2017, 3 pages.
Lee, Dave, "The five big announcements from Google I/O", BBC, May 18, 2017, 11 pages.
Notice of Allowance for U.S. Appl. No. 13/490,912, dated Jan. 7, 2014,17 pages.
Ooyala, 'Overview', [online] [retrieved on Nov. 26, 2007]. Retrieved from http://www.ooyala.com/about.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Riley, Duncan, "TechCrunch—Contextual In-Video Advertising: ScanScout," [online] [Retrieved on Mar. 11, 2011]; Retrieved from the Internet URL: http://www.techcrunch.com/2007/0514/contextual-in-video=-advertising-scanscout/; 5 pages.
Sablich, Justin, "Planning a Trip With the Help of Google Home", New York Times, dated May 31, 2017, 6 pages.
Smith, Dave, "The Amazon Echo got 2 incredibly useful features thanks to a new update", Business Insider, Jun. 1, 2017, 2 pages.
Techcrunch, 'Cisco and Click.tv?', Jul. 30, 2007, [online] [retrieved on Nov. 26, 2007]. Retrieved from http://www.techcrunch.com/2007/07/30/cisco-and-clicktv/.
Techcrunch, 'Hulu Makes First Acquisition; Chinese Video Startup To Form Backbone of New Service', Sep. 12, 2007, [online] [retrieved on Nov. 26, 2007]. Retrieved from http://www.techcrunch.com/2007/09/12/hulu-makes-first-acquisition-chinese-video-startup.
Techcrunch, 'Video Ads: Every Startup has a Different Solution', Jul. 6, 2007 [online][retrieved on Nov. 26, 2007]. Retrieved from http://www.techcrunch.com2007/07/06/video-ads-somebody-needs-to-solve-this-problem.
U.S. Notice of Allowance for U.S. Appl. No. 11/948,643, dated Feb. 27, 2012 (12 pages).
U.S. Notice of Allowance on U.S. Appl. No. 13/168,904, dated Jan. 10, 2014 (8 pages).
U.S. Notice of Allowance on U.S. Appl. No. 14/278,473 dated Oct. 31, 2016.
U.S. Office Action dated Dec. 9, 2010, for U.S. Appl. No. 11/948,643 (20 pages).
U.S. Office Action for U.S. Appl. No. 13/490,912, dated Apr. 16, 2013, 31 pages.
U.S. Office Action for U.S. Appl. No. 13/490,912, dated Aug. 2, 2012, 25 pages.
U.S. Office Action for U.S. Appl. No. 13/295,507 dated May 10, 2013.
U.S. Office Action for U.S. Appl. No. 13/295,507 dated Oct. 30, 2013.
U.S. Office Action on U.S. Appl. No. 13/168,904 dated Aug. 7, 2013.
U.S. Office Action on U.S. Appl. No. 13/295,507 dated Jul. 23, 2015.
U.S. Office Action on U.S. Appl. No. 13/295,507 dated Mar. 24, 2016.
U.S. Office Action on U.S. Appl. No. 13/932,836 dated Aug. 16, 2017 (15 pages).
U.S. Office Action on U.S. Appl. No. 14/190,523 dated May 20, 2016.
U.S. Office Action on U.S. Appl. No. 14/190,523 dated Aug. 21, 2014.
U.S. Office Action on U.S. Appl. No. 14/190,523 dated Dec. 3, 2014.
U.S. Office Action on U.S. Appl. No. 14/190,523 dated Apr. 2, 2015.
U.S. Office Action on U.S. Appl. No. 14/190,523 dated Jun. 6, 2016.
U.S. Office Action on U.S. Appl. No. 14/190,523 dated Aug. 17, 2015.
U.S. Office Action on U.S. Appl. No. 14/190,523 dated Feb. 22, 2017.
U.S. Office Action on U.S Appl. No. 14/190,523 dated May 26, 2015.
U.S. Office Action on U.S. Appl. No. 14/190,523 dated Nov. 25, 2015.
U.S. Office Action on U.S. Appl. No. 14/278,473 dated May 3, 2016.
U.S. Office Action on U.S. Appl. No. 14/278,473 dated Sep. 23, 2016.
U.S. Office Action on U.S. Appl. No. 15/584,940 dated Aug. 14, 2017 (15 pages).
Willens, Max, "For publishers, Amazon Alexa holds promise but not much money (yet)", Digiday, Jul. 6, 2017, 5 pages.
YuMe Networks, 'About Us', [online] [retrieved on Nov. 26, 2007]. Retrieved from http://yumenetworks.com/about.html.

(56) References Cited

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Heater, "Amazon Alexa devices can finally tell voices apart", TechCrunch, Oct. 11, 2017, 6 pages.
International Search Report and Written Opinion for PCT Appl. Ser. No. PCT/US2017/049713 dated Oct. 25 2017, 12 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Notice of Allowance on U.S. Appl. No. 13/932,836 dated Dec. 18, 2017, 7 pages.
U.S. Office Action on U.S. Appl. No. 15/190,897 dated Dec. 7, 2017, 34 pages.
International Preliminary Report on Patentability for Appl. Ser. No. PCT/US2017/049713 dated Jul. 11, 2019 (8 pages).
U.S. Office Action for U.S. Appl. No. 15/638,304 dated Jul. 1, 2019 (10 pages).
U.S. Office Action for U.S. Appl. No. 15/638,324 dated Jul. 8, 2019 (27 pages).
U.S. Office Action for U.S. Appl. No. 15/638,333 dated Jun. 26, 2019 (19 pages).
Communication pursuant to Article 94(3) EPC dated Feb. 22, 2019 for EP Application No. 17768558.3, 8 pages.
Final Office Action on U.S. Appl. No 15/395,689 dated Mar. 22, 2019, 13 pages.
Non-Final Office Action on U.S. Appl. No. 15/395,689 dated Sep. 13, 2018, 13 pages.
Non-Final Office Action on U.S Appl. No. 15/638,304 dated Mar. 7, 2019.
Notice of Allowance on U.S. Appl. No. 15/190,897 dated May 6, 2019, 15 pages.
Notice of Reasons for Rejection for Japanese Application No. 2017-556891 dated Feb. 18, 2019, 13 pages.
Office Action for German Patent Application No. 11 2017 000 122.6 dated Sep. 5, 2018, 1 page.
Office Action for Korean Application No. 10-2017-7031189 dated Nov. 29, 2018, 63 pages.
Yamato, et al., "Ubiquitous Service Composition Technology for Ubiquitous Network Environments", NTT Network Service Systems Laboratories, NTT Corporation, vol. 48 No. 2, Feb. 2007, 16 pages.
Non-Final Office Action on U.S. Appl. No. 15/395,689 dated Aug. 21, 2019, 13 pages.
Notice of Allowance on U.S. Appl. No. 15/190,897 dated Oct. 25, 2019.
Notice of Allowance on U.S. Appl. No. 15/190,897 dated Aug. 27, 2019, 14 pages.
Non-Final Office Action for U.S. Appl. No. 15/638,304 dated Dec. 2, 2019 (10 pages).
Advisory Action for U.S. Appl. No. 15/638,333 dated Feb. 28, 2020 (4 pages).
Applicant Initiated Interview Summary for U.S. Appl. No. 15/638,324 dated Feb. 28, 2020 (5 pages).
Examination Report for EP Application Ser. No. 17768558.3 dated Apr. 3, 2020 (9 pages).
Final Office Action for U.S. Appl. No. 15/395,689 dated Mar. 5, 2020 (14 pages).
Final Office Action for U.S. Appl. No. 15/638,324 dated Jan. 3, 2020 (29 pages).
Final Office Action for U.S. Appl. No. 15/638,333 dated Dec. 17, 2019 (19 pages).
Notice of Allowance for U.S. Appl. No. 13/168,904 dated Jan. 10, 2014 (8 pages).
Final Office Action for U.S. Appl. No. 15/638,304 dated Nov. 16, 2020 (11 pages).
Notice of Allowance for U.S. Appl. No. 15/395,689 dated Oct. 28, 2020 (7 pages).
Corrected Notice of Allowability for U.S. Appl. No. 15/395,689 dated Sep. 9, 2020 (2 pages).
Examination Report for IN Appln. Ser. No. 201747045160 dated Apr. 28, 2020 (7 pages).
First Office Action for CN Appln. Ser. No. 201780001369.6 dated Jul. 3, 2020 (18 pages).
Non-Final Office Action for U.S. Appl. No. 15/638,324 dated Jul. 2, 2020 (35 pages).
Non-Final Office Action for U.S. Appl. No. 15/638,333 dated Aug. 6, 2020 (25 pages).
Notice of Allowance for U.S. Appl. No. 15/395,689 dated Jul. 29, 2020 (7 pages).
Notice of Reasons for Rejection for JP Appln. Ser. No. 2019-135381 dated Aug. 17, 2020 (11 pages).
Final Office Action for U.S. Appl. No. 15/638,324 dated Jan. 26, 2021 (24 pages).
Supplemental Notice of Allowability for U.S. Appl. No. 15/395,689 dated Jan. 6, 2021 (2 pages).
Decision of Rejection for JP Appln. Ser. No. 2019-135381 dated Mar. 1, 2021 (6 pages).
Final Office Action for U.S. Appl. No. 15/638,333 dated Jan. 28, 2021 (19 pages).
Second Office Action for Chinese Appln. Ser. No. 201780001369.6 dated Apr. 8, 2021 (3 pages) and English translation (4 pages).

* cited by examiner

Feed Errors - Streaming_Movies ~604

☐ Unknown Search Entity (3 errors)  Suggestion: use a unique movie ID ~616

606~ feed item ID    Line Number ~608
      1337           42
      6331           1200
      7777           1500
           ~610

☐ Multiple Search Entity Matches (1 error)  Suggestion: use a unique movie ID ~618

612~ feed item ID    Line Number ~614
      1513           66

602 (container)
500

FIG. 6

AUDIO BASED ENTITY-ACTION PAIR BASED SELECTION

CROSS-REFERENCE TO RELATED APPLICATIONS

This application claims the benefit and priority under 35 U.S.C. § 120 as a continuation-in-part of U.S. patent application Ser. No. 13/932,836, filed Jul. 1, 2013, which claims priority under 35 U.S.C. § 119 to U.S. Provisional Application 61/829,634, filed May 31, 2013. This application also claims the benefit and priority under 35 U.S.C. § 120 as a continuation-in-part of U.S. patent application Ser. No. 15/395,689, filed Dec. 30, 2016. The contents of the foregoing applications are herein incorporated by reference in their entirety.

BACKGROUND

Online content may be available regarding any number of disparate topics. For example, a first website on the Internet may be devoted to the migratory habits of bats and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

SUMMARY

According to one aspect of the disclosure, a system for transmission of packetized data in a voice activated computer network environment includes a data processing system that can have a processor and a memory. The data processing system can receive, via an interface, data packets that can include an input audio signal detected by a sensor of a client computing device. The data processing system can identify a first request can include at least one keyword and a trigger keyword within the input audio signal detected by the sensor of the client computing device. The data processing system can determine a search result and a first search entity based on the at least one keyword. The data processing system can determine a first entity-action pair associated with the first search entity and the trigger keyword. The action of the first entity-action pair can include an action performed regarding the first search entity. The data processing system can identify a quality score of a digital component associated with the first entity-action pair. The data processing system can determine the quality score is above a predetermined threshold. The data processing system can transmit, to the client computing device, an output audio signal. The output audio signal can include the digital component responsive to the quality score being above the predetermined threshold.

According to another aspect of the disclosure, a method of data transmission in a voice activated computer network environment can include receiving, via an interface, data packets that can include an input audio signal detected by a sensor of a client computing device. The method can include identifying a first request that can include at least one keyword and a trigger keyword within the input audio signal detected by the sensor of the client computing device. The method can include determining a search result and a first search entity based on the at least one keyword. The method can include determining a first entity-action pair associated with the first search entity and the trigger keyword. The action of the first entity-action pair can include an action performed regarding the first search entity. The method can include identifying a quality score of a digital component associated with the first entity-action pair. The method can include determining the quality score is above a predetermined threshold. The method can include transmitting, to the client computing device, an output audio signal. The output audio signal can include the digital component responsive to the quality score being above the predetermined threshold.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 6 illustrates an example illustration of one implementation of an electronic display showing errors identified in a search entity related feed.

Like reference numbers and designations in the various drawings indicate like elements.

DETAILED DESCRIPTION

Figure 1A:
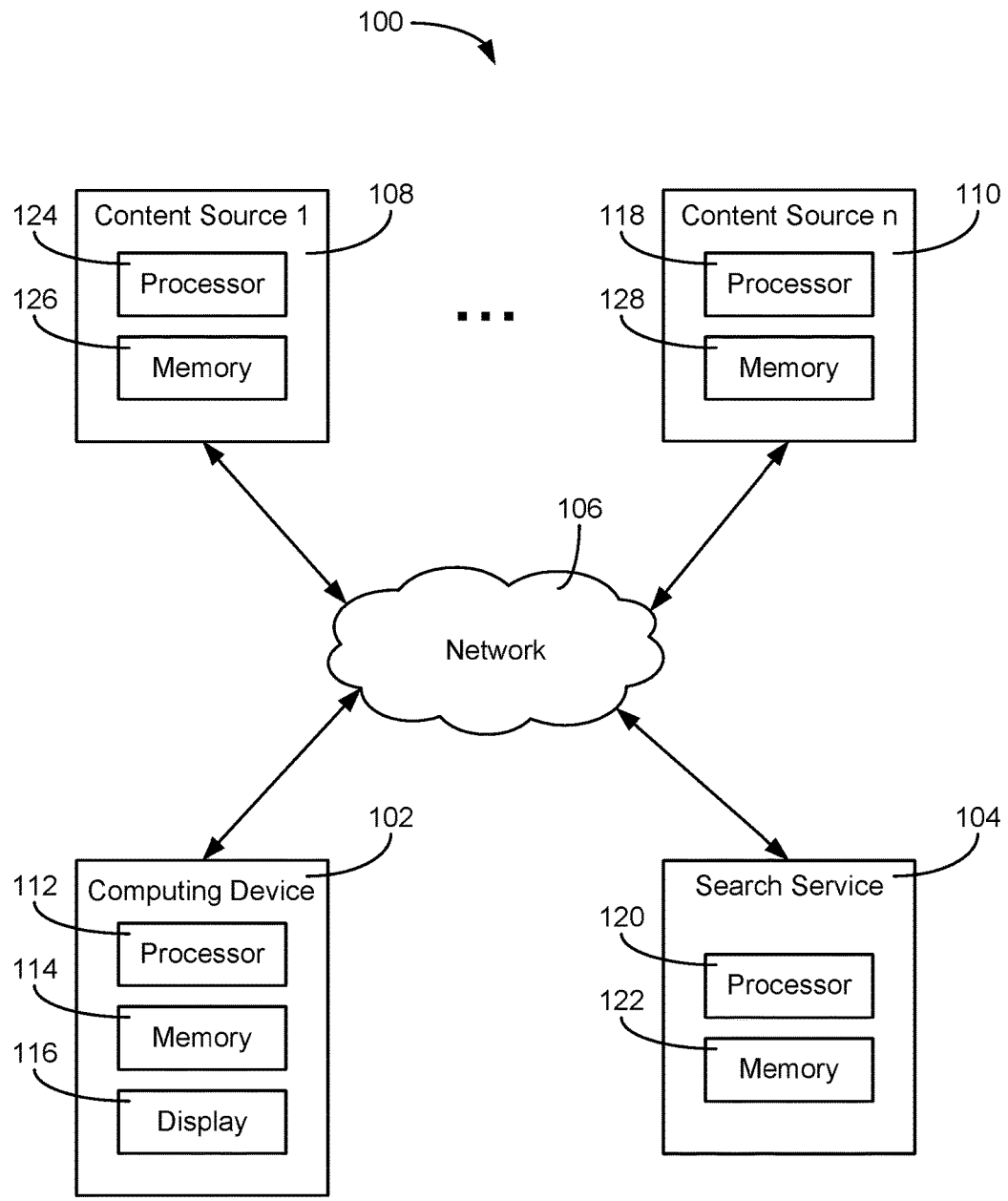
FIG. 1A illustrates a block diagram of a computer system.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to improving the efficiency and effectiveness of information transmission and processing over disparate computing resources. It is challenging for disparate computing resource to efficiently process, and consistently and accurately parse audio-based instructions in a voice-based computing environment. For example, the disparate computing resources may not have access to the same voice models, or may have access to out of date or unsynchronized voice models that can make it challenging to accurately and consistently parse the audio-based instructions.

Systems and methods of the present disclosure are generally directed to a data processing system that routes packetized actions via a computer network. The data processing system can process the voice-based input using specifically voice models that are trained based on aggregate voice to parse the voice-based instructions and create an action data structure that can include digital components and entity-action pairs. The data processing system can transmit the action data structure to one or more component of the data processing system or third-party provider devices, thereby allowing the third-party provider device to process the action data structure without having to process the voice-based input. By processing the voice-based input for a plurality of third-party provider devices, the data processing system can improve the reliability, efficiency, and accuracy with which voice-based instructions are processed and performed.

The present solution can reduce resource consumption, processor utilization, battery consumption, bandwidth utilization, size of an audio file, or amount of time consumed by a speaker by parsing voice-based instructions from an end user, constructing an action data structure using a template, and routing the action data structure to a corresponding third-party provider.

According to some aspects of the present disclosure, a client device (also referred to as a client computing device) may receive first-party and third-party content for presentation to a user. The content can be presented to the user in an auditory fashion, visually, or a combination of both. The content can be referred to as a content item or a digital component. In some implementations, the digital component is a component of the content item. First-party content can refer to the primary online content requested by a client device, such as a search result or action provided by a search service to the client device. For example, first-party content may be a search result webpage or output audio signal requested by the device or may be a screen presented as part of a stand-alone application (e.g., a navigation program, a search program, etc.). Third-party content can refer to additional content that may be provided in conjunction with the first-party content. For example, third-party content may be a public service announcement or a digital component that appears in conjunction with a requested webpage (e.g., a search result webpage from a search engine, a webpage that includes an online article, a webpage of a social networking service, etc.) or within a stand-alone application (e.g., a digital component within a game, a messaging program, a navigation program, etc.). The digital component can be content associated with the first-party content. Generally, a first-party content provider refers to any content provider that allows another content provider (i.e., a third-party content provider) to provide content in conjunction with that of the first-party provider. The first-party content provider may or may not be compensated for allowing a third-party provider to provide content with the first-party provider's content. For example, the first-party provider may receive compensation for allowing certain paid public service announcements or digital components to be provided in conjunction with the first-party provider's content.

A first-party search service may be configured to use search entities to represent concepts that underlie search queries. Search entities may generally correspond to named entities in the physical world. For example, a search entity may correspond to a specific location, person, group of people, media content (e.g., movies, songs, audio, digital components, etc.), or the like. In such a case, a pool of facts or other information regarding the search entity may be made available as part of search results, in addition to, or in lieu of, links to webpages regarding the entity. For example, a search query may correspond to a search entity for the Taj Mahal. Associated with the Taj Mahal search entity may be various facts about the mausoleum, such as its location, height, when it was constructed, or other such information. In some implementations, a search entity may be presented in conjunction with search results as part of a search result screen. For example, a search result webpage may include hyperlinks to webpages that match a search query as well as a search entity that corresponds to the search query (e.g., a search for the Taj Mahal may result in links to Taj Mahal-related webpages as well as the Taj Mahal search entity being displayed). In some embodiments, a search entity may be related to one or more other search entities. For example, a search entity for a particular musician may be related to search entities for his or her particular songs, albums, etc.

A first-party search service may also have one or more online actions associated with a given search entity. Such associations may be represented as entity-action pairs. In addition to general information about a particular search entity (e.g., what a user may wish to know about the search entity), the search entity may also be associated with various online actions (e.g., what the user may wish to do regarding the search entity). For example, assume that a search entity relates to a particular movie. In such a case, online actions that may be associated with the search entity may include purchasing a hardcopy of the particular movie (e.g., DVD, Blu-Ray, etc.) or watching the movie via streaming. Examples of online actions may include, but are not limited to, streaming a piece of media content, making an online purchase, making reservations, purchasing tickets, or any other form of online action.

In some cases, a first-party search service may be configured to select third-party content for presentation with search results based on an entity-action pair. For example, assume that a service provider is selling DVD copies of a particular movie. In such a case, the service provider may specify that they wish to place a digital component whenever the entity-action pair including the movie entity and "purchase" online action is triggered by a search query. The search service may also conduct a content auction in which different third-party content providers compete for the ability to include third-party content with the search results. For example, the system may provide a link to the website of the service provider with the search results, allowing the user to quickly purchase the DVD.

Other types of third-party content may be selected by the system, such as product digital components or sponsored hyperlink search results, in addition to or in lieu of content selected based on an entity-action pair. These types of third-party content may be associated with particular keywords specified by their content providers. For example, assume that a user performs a generic search for "new DVD releases." In response, the system may conduct a content auction among those content providers that specified the keywords "new DVD releases." In conjunction with the search results, the system may then include a link to the website of a content provider that sells DVDs. Since the search query does not pertain to any particular search entity, no search entity or third-party content associated with an entity-action pair may be provided with the search results. In other words, content auctions based on search terms are always likely to be conducted, but content auctions for entity-action pairs may only be conducted if the search query pertains to a particular search entity.

In contrast to third-party content selected based solely on search queries (e.g., product digital components, sponsored hyperlink search results, etc.), content selected based on entity-action pairs allows different types of content providers to compete against other content providers that offer comparable products or services. For example, assume that a third-party content provider operates a streaming service and has the movie "Sheriff Bob" available for rental at $1.99 and that another third-party content provider has DVD copies of the movie available for purchase at $24.99. Both content providers may opt to compete in content auctions whenever a search is performed for the keywords "Sheriff Bob" (e.g., content is selected based solely on the search keywords). In such a case, however, the DVD retailer may always be willing to bid a higher amount than the streaming provider, since the products and services differ. For example, the DVD retailer may be willing to pay $2 whenever a user clicks on a link to the provider's website and purchases a DVD. Since this amount is greater than the full cost to rent the movie from the streaming provider, the streaming provider is unlikely to be willing to place a competitive bid for the search terms. Placing a bid for a specific entity-action pair, however, allows the streaming provider to compete against other streaming providers. For example, the streaming provider may bid on the entity-action pair of {entity="Sheriff Bob", action="Stream Now"} and compete in an auction only against other streaming providers. The DVD retailer may also opt to bid on another entity-action pair such as {entity="Sheriff Bob", action="Purchase DVD"} in addition to, or in lieu of, bidding on specific search terms.

According to various implementations, the system may be configured to facilitate the matching of an entity-action pair to content from a third-party content provider. In some implementations, the system receives a feed containing data regarding the inventory of a provider. The feed may be, but is not limited to, a text file, a structured data file (e.g., an XML file, a JSON file, etc.), or a spreadsheet. Each item in the feed may correspond to an actual item or service being offered by the content provider. Feed items may be analyzed by the system to identify a corresponding search entity and/or online action associated with the identified search entity. Identified entity-action pairs may also be associated with auction parameters set by the third-party provider and used by the system to place bids in content auctions regarding the entity-action pairs. For example, a streaming provider may upload a feed containing some or all of the content the provider currently has available to stream. An uploaded feed may also be associated with auction parameters (e.g., bid amounts, budgets, etc.), such as those found within a campaign. Thus, the streaming provider may place a digital component whenever one of the available movies in the feed and the online action of streaming is related to a given search query. In various implementations, a third-party content provider may receive feedback from the system regarding the matching process. For example, the provider may receive a listing of errors corresponding to the system being unable to match a particular feed item to a search entity or multiple search entities being matched to a single feed item.

For situations in which the systems discussed here collect personal information about users, or may make use of personal information, the users may be provided with an opportunity to control whether programs or features collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Referring to FIG. 1A, a block diagram of a computer system 100 in accordance with a described implementation is shown. System 100 includes a client device 102, which can also be referred to a client computing device, that communicates with other computing devices via a network 106. Client device 102 may execute a web browser or other application (e.g., a media player, a social networking application, a navigation program, etc.) to retrieve content from other devices over network 106. For example, client device 102 may communicate with any number of content sources 108, 110 (e.g., a first content source through nth content source). Content sources 108, 110 may provide webpage data and/or other content, such as images, video, audio, or an application to client device 102. Computer system 100 may also include a search service 104 configured to perform a web search in response to a search query received from client device 102. For example, search service 104 may return hyperlinks or other resource identifiers for any of content sources 108-110 to client device 102 based on a given search query. For example, search service 104 may provide a hyperlink to content source 108, if content source 108 serves a webpage devoted to golf and client device 102 requests a search for golf-related content.

Network 106 may be any form of computer network that relays information between client device 102, content sources 108, 110, and search service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be of any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client device 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other content received from content sources 108, 110, and/or third-party content selected by search service 104.

Content sources 108, 110 may be one or more electronic devices connected to network 106 that provide content to client device 102. For example, content sources 108, 110 may be computer servers (e.g., FTP servers, file sharing servers, web servers, etc.) or a combination of servers (e.g., data centers, cloud computing platforms, etc.). Content may include, but is not limited to, webpages, audio data, video data, and other forms of data files (e.g., spreadsheets, text files, images, etc.). Similar to client device 102, content sources 108, 110 may include processing circuits having processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

Similar to content sources 108, 110, search service 104 may be one or more electronic devices connected to network 106 that provides data to client device 102 for presentation to a user. Search service 104 may include a computer server (e.g., an FTP server, file sharing server, web server, etc.) or a combination of servers (e.g., a data center, a cloud computing platform, etc.). Search service 104 may include a processing circuit including a processor 120 and a memory 122 that stores program instructions executable by processor 120. In cases in which search service 104 represents a combination of servers or other computing devices, processor 120 represents their collective processors and memory 122 represents their collective memories.

Search service 104 is configured to provide a listing of webpages or other online services available from content sources 108, 110 in response to a search query. In some implementations, search service 104 may maintain an index of keywords or topics of the webpages or other services available from content sources 108, 110. For example, search service 104 may use text and/or image recognition on a webpage from content source 108 to identify keywords or a topic of the webpage. In response to receiving a search query from client device 102, search service 104 may match the search query to the index, to determine the best matching webpages or other services from content sources 108, 110. The received search query may be in text form or may be converted into text form by search service 104 (e.g., search service 104 may use voice recognition to convert a spoken search query into text form). Search service 104 may then provide the network addresses of the matching webpages or other services to client device 102 for presentation on display 116 or via another user interface device. For example, the search results may be presented as hyperlinks on a webpage-based search result screen, as links in a stand-alone application, or as audible search results played by a speaker of client device 102. Since the search results were specifically requested by client device 102, they may be considered as being first-party content.

According to various implementations, search service 104 may also be configured to identify one or more search entities related to a search query received from client device 102. In many cases, a search entity corresponds to a named entity in the physical world (e.g., a particular person, place, piece of media content, etc.). In contrast to search results which may differ depending on the exact phrasing of a search query, a search entity may be configured to represent the actual concept underlying a search. For example, the search queries for "Sheriff Bob the Movie" and "Sheriff Bob reviews" may yield different search results from search service 104. In the former case, the search results may include links to webpages that provide facts about the Sheriff Bob movie (e.g., when the movie was released, who stars in the movie, the movie's budget, etc.). In the latter case, the search results may instead include links to webpages that review the Sheriff Bob movie. Underlying both searches, however, is the concept of the Sheriff Bob movie. In some implementations, search service 104 may analyze a given search query to determine the search entity most likely underlying the search. Thus, search service 104 may determine that both searches relate to the search entity for the Sheriff Bob movie.

Search entities may be related to one another. For example, the search entity for the actor, "John Doe," may be related to the search entity for the movie "Sheriff Bob," if John Doe starred in the movie. Relationships between search entities may be any type of relationship between their corresponding physical entities. For example, two locations may be related based on their proximity to one another, a piece of media content (e.g., a song, movie, album, etc.) may be related to an actor or musician that performed in the media content, or two people may be related by blood, marriage, or adoption. In some implementations, two search entities may be related based on how often searches for the two entities originated from the same source. For example, users that are interested in the actor John Doe may also be interested in Kapinski the Singing Koala, even though the two never appeared in the same movies together and are not otherwise related. If a high enough number of users searched for both entities, however, the two may be related based on the users' interests. In further implementations, search entities may be related based on semantics (e.g., search entities that have the same or similar names). For example, the "Leaning Tower of Pisa" search entity corresponding to the landmark in Pisa, Italy may be related to the "Leaning Tower of Shoes" search entity corresponding to a particular shoe store located in Bangor, Me., since a search query of "Leaning Tower" may relate to either of the two entities.

In various implementations, a search entity used by search service 104 may also have one or more online actions associated with it, thereby forming one or more entity-action pairs. Online actions may be any type of actions that can be performed regarding a particular search entity. Examples of online actions may include, but are not limited to, getting directions to a particular event or location, downloading or streaming a particular piece of media content, making an online purchase, making reservations (e.g., at a restaurant, hotel, airline, etc.), playing a game, making a donation to a particular charity or other organization, signing up for email or text alerts, navigating to a particular website, contacting a particular person or entity, reading reviews about a product or service, comparing prices across retailers, shopping for a product or service, saving an offer for a product or service, purchasing a product or service, getting a quote for a product or service, getting more information from a third-party provider regarding a product or service, joining or enrolling in a program (e.g., joining a streaming service, etc.), making an appointment, setting up a service (e.g., cable television, satellite television, Internet connectivity, etc.), viewing an email, tracking a package, creating an event for a social networking system, or checking in to a business (e.g., an airline, a hotel, etc.). The types of online actions associated with a search entity may also depend on the type of the entity. For example, actions relating to downloading or streaming may only be associated with search entities for media content. In some implementations, search entities and/or their associated actions may be hardcoded or otherwise defined by the operator of search service 104. In further implementations, search entities and/or their associated actions used by search service 104 may be defined via an online project (e.g., an online encyclopedia or other open source project) or may be identified automatically by search service 104. For example, search service 104 may identify new search entities, their relationships, and/or any associated online actions when indexing the webpages or other services provided by content sources 108, 110.

Search service 104 may be configured to allow third-party content providers to provide their content in conjunction with search results to client device 102. For example, a third-party content provider, such as a service provider, may compensate the operator of search service 104 for the ability to include a paid hyperlink with search results provided to client device 102. In some implementations, search service 104 may conduct a content auction to select which third-party content is provided with the search results. Such an auction may be conducted in real-time (e.g., in response to search service 104 receiving a search query), in near real-time, or at any time, in various implementations. In some cases, a third-party content provider may specify auction parameters that control how and when a bid is placed in a content auction on behalf of the provider. For example, a third-party content provider may specify bidding parameters that control the amount of the provider's bid in a given auction (e.g., a minimum bid, a maximum bid, a target bid, a budget, etc.). In some implementations, a third-party content provider may also specify one or more search terms or phrases to control when an auction bid is placed on the provider's behalf. For example, a third-party service provider may specify that they wish to place a digital component link with search results, whenever a client device searches for the phrase "Leaning Tower of Shoes." Such a digital component may be a hotlinked image, a hyperlink denoted as being a paid digital component within the search results, or other form of third-party content presented in conjunction with the search results.

Auction parameters may be received by search service 104 in any number of different ways. In some implementations, search service 104 may receive auction parameters from a third-party content provider via a webpage-based input mechanism or via a stand-alone application (e.g., an application specifically configured to provide data to search service 104). In other words, search service 104 may provide a user interface to third-party content providers to specify auction-related data to search service 104. In further implementations, search service 104 may receive auction parameters via a feed from a third-party content provider. A feed may be any form of text-based data that contains auction parameters and may be uploaded to search service 104.

According to some implementations, search service 104 may be configured to associate auction parameters with a particular search entity or entity-action pair. In contrast to auction parameters focused on particular sets of search terms, an entity-action pair may underlie any number of different search queries. In response to receiving a search query from client device 102, search service 104 may identify the most likely search entity underlying the search, any other search entities related to it, and/or any entity-action pairs for the search entity. By tying third-party content to particular entity-action pairs, third-party content providers may compete in content auctions against other providers that offer the same products or services. For example, a third-party content provider may specify auction parameters via search service 104 that their content is related to the entity-action pair of {Sheriff Bob, stream}, e.g., the provider runs a streaming service that has the Sheriff Bob movie available for streaming. If the provider were to use search terms instead, he or she may be competing against other providers that offer different services. For example, the streaming provider may compete against another third-party provider that sells DVD copies of the Sheriff Bob movie when the search term "Sheriff Bob" is received by search service 104. In cases in which the profit margins for the different services or products also differ, this could lead to the higher margin product or service always being selected, since their corresponding providers may be willing to use higher bid amounts. By tying auction parameters to entity-action pairs, however, a streaming provider may compete against other streaming providers, a DVD retailer may compete against other DVD retailers, etc.

After identifying the most relevant search entity to a received query, search service 104 may rank any online actions or other search entities related to the entity. In some implementations, search service 104 may do so based on the terms used in the search query. For example, a search query for "Sheriff Bob streaming" may be more closely related to the entity-action pair of {Sheriff Bob, stream} than an entity-action pair regarding purchasing a DVD copy of the movie. Search service 104 may use such a ranking to determine which, if any, content auctions are to be performed. For example, search service 104 may determine that content auctions are to be conducted for the top five ranked entity-action pairs for a given search query. In some implementations, search service 104 may select multiple third-party content providers for a given entity-action pair. For example, the top two bidders in a content auction for the entity-action pair of {Sheriff Bob, stream} may be allowed by search service 104 to include their content for presentation with search results from the service. In some implementations, search service 104 may conduct a content auction as a second-price auction (e.g., the top bidder actually pays the second highest bidder's amount, the second highest bidder pays the third-highest bidder's amount, etc.). In other implementations, search service 104 may conduct a first-price auction, a Vickrey-Clark-Groves (VCG) auction, a lifetime value (LTV) auction, or any other type of auction. In further implementations, search service 104 may impose a threshold cap on the number of third-party content providers that can win a given content auction. For example, search service 104 may impose a maximum of three digital components for a given entity-action pair. In yet further implementations, search service 104 may select third-party content based in part on a quality score or other metric for the third-party content's provider. For example, a click through rate (e.g., a measure of how likely a user is to click on the provider's content) may be used in addition to, or in lieu of, the provider's content auction bid to determine whether or not the provider's content will be shown with the search results. In other words, a third-party content provider that has the highest auction bid may nonetheless be passed over for content selection if the provider has a low quality score. Entity-action pairs may also have associated reserve prices set in search service 104 such that one or more bids must be above the reserve price before its associated content will be selected for presentation with the search results.

Search service 104 may vary the visual layout of third-party content in accordance with its ranking of a search entity's relationships. In various implementations, the visual layout of third-party content may be varied such that the content is displayed more prominently (e.g., if the content is closely related to the search query) or less prominently (e.g., if the content is more distally related to the search query).

According to various implementations, search service 104 is configured to facilitate the matching of a search entity to a good or service being offered by a third-party content provider. In some implementations, search service 104 may receive a feed from a computing device operated by a third-party content provider (e.g., content source 110), each feed item corresponding to a good or service being offered. For example, assume that content source 110 is operated by an online retailer that sells hardcopies of books. In such a case, the retailer may upload a feed to search service 104 that contains a listing of some or all of the books available from the retailer. In response, search service 104 may analyze the feed and identify search entities that correspond to the various books. Actions associated with the search entities may be provided explicitly by the content provider or may be determined by search service 104 based on data in the feed (e.g., search service 104 may determine that the online action associated with the feed items is "purchase book"), thereby forming entity-action pairs with the identified search entities. In some implementations, search service 104 may generate one or more reports on the matching of feed items to search entities. For example, search service 104 may generate and provide a report listing all feed items that were successfully matched to search entities. In another example, search service 104 may generate and provide a report listing all feed items that could not be uniquely matched to a search entity (e.g., no search entities were matched to a particular feed item, multiple search entities were matched to a particular feed item, etc.).

In some implementations, entity-action pairs identified by search service 104 via an uploaded feed may be associated with third-party content. For example, identified entity-action pairs may be associated with an ad group or a campaign that includes third-party content. The third-party content may be any form of content associated with performing an online action relative to a search entity. Third-party content may include, but is not limited to, a hyperlink to a third-party content provider's website or a set of machine instructions that cause an application executed by client device 102 to perform the action. For example, clicking on third-party content related to a {song, purchase download} entity-action pair may cause a marketplace application on client device 102 to complete the purchase and download of the corresponding song. Third-party content may also include text, images, or other media (e.g., audio, video, etc.) to indicate an online action associated with a search entity.

Third-party content associated with entity-action pairs may also be grouped or categorized by search service 104. For example, a third-party content provider may group content in different campaigns (e.g., campaigns) or content subgroups of campaigns. For example, a retailer that operates a streaming service and also sells DVD copies of movies may create separate campaigns for each product type on search service 104. In some implementations, the matching of identified entity-action pairs from a feed to a campaign or ad grouping is received explicitly from the third-party content provider. In other implementations, search service 104 is configured to automatically match entity-action pairs in an uploaded feed to a particular campaign or other grouping of content. For example, search service 104 may identify items in a feed as e-books and match the identified entity-action pairs to a campaign devoted to selling e-books.

In cases in which search service 104 conducts a content auction to determine which third-party content associated with an entity-action pair is provided to client device 102, entity-action pairs identified by search service 104 may also be associated with auction parameters. Auction parameters may include any form of parameters that control the bidding in a content auction by a third-party content provider. For example, auction parameters may include a target bid amount, a minimum bid amount, a maximum bid amount, one or more budget constraints (e.g., a daily budget, a weekly budget, etc.), or timing information that defines a time period in which bids are placed. The auction parameters may be associated with a particular campaign or other grouping of third-party content, in some implementations (e.g., a campaign may have auction parameters).

In various implementations, search service 104 may conduct content auctions for entity-action pairs in the same manner as content auctions for search terms. In such cases, search service 104 may generate "fake" keywords to represent specific entity-action pairs. For example, assume that client device 102 sends a search query of "Sheriff Bob show times in Atlanta." Based on this query, search service 104 may conduct a content auction among third-party content providers that specified the same or similar keywords in the query. In addition to the keyword-based auction, or in lieu thereof, search service 104 may also conduct a separate content auction for the entity-action pair of {search entity="Sheriff Bob", action="purchase tickets"}. Search service 104 may use the set of keywords "Sheriff Bob (2014) 45aE5" to conduct an auction for the entity-action pair, where 45aE5 represents a unique identifier for the search entity or entity-action pair. In other words, a fake keyword may be uniquely associated with a particular search entity or entity-action pair and used by search service 104 as part of a content auction.

Figure 1B:
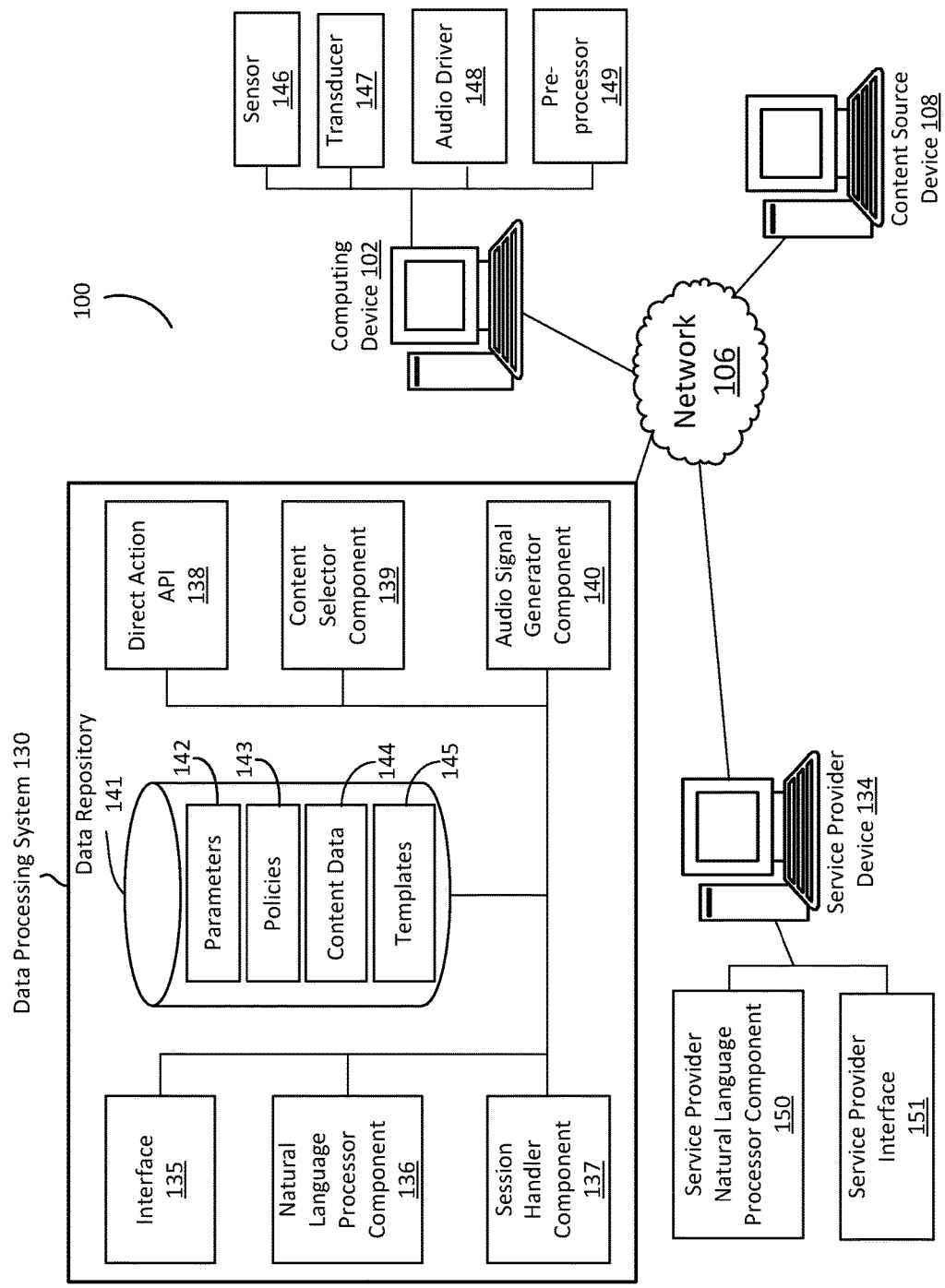
FIG. 1B is an illustration of a system to route packetized actions via a computer network.

FIG. 1B illustrates an example system 100 to route packetized actions via a computer network. The system 100 can include content selection infrastructure. The system 100 can include a data processing system 130. The data processing system 130 can communicate with one or more of a content source computing device 108, service provider computing device 134, or client computing device 102 via a network 106. The network 106 can include computer networks such as the Internet, local, wide, metro, or other area networks, intranets, satellite networks, and other communication networks such as voice or data mobile telephone networks. The network 106 can be used to access information resources such as web pages, web sites, domain names, or uniform resource locators that can be presented, output, rendered, or displayed on at least one computing device 131, such as a laptop, desktop, tablet, personal digital assistant, smart phone, portable computers, or speaker. For example, via the network 106 a user of the computing device 131 can access information or data provided by a service provider 134 or content source device 108. The computing device 131 may or may not include a display; for example, the computing device may include limited types of user interfaces, such as a microphone and speaker. In some cases, the primary user interface of the computing device 131 may be a microphone and speaker.

The network 106 can include or constitute a display network, e.g., a subset of information resources available on the internet that are associated with a content placement or search engine results system, or that are eligible to include third-party content items as part of a content item placement campaign. The network 106 can be used by the data processing system 130 to access information resources such as web pages, web sites, domain names, or uniform resource locators that can be presented, output, rendered, or displayed by the client computing device 102. For example, via the network 106 a user of the client computing device 102 can access information or data provided by the content source computing device 108 or the service provider computing device 134.

The network 106 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 106 may include a wireless link, such as an infrared channel or satellite band. The topology of the network 106 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 130. The data processing system 130 can be a component of the search service 104. In other implementations, the search service 104 can be a component of the data processing system 130. The data processing system 130 can include at least one logic device such as a computing device having a processor to communicate via the network 106, for example with the computing device 131, the content source device 108 (content source device 108), or the service provider device 134 (or service provider 134). The data processing system 130 can include at least one computation resource, server, processor or memory. For example, the data processing system 130 can include a plurality of computation resources or servers located in at least one data center. The data processing system 130 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 130 components, including servers and storage systems, and coupling them with advanced system management tools allows more efficient use of server resources, which saves power and processing requirements and reduces bandwidth usage.

The system 100 can include, access, or otherwise interact with at least one service provider device 134. The service provider device 134 can include at least one logic device such as a computing device having a processor to communicate via the network 106, for example with the computing device 131, the data processing system 130, or the content source device 108. The service provider device 134 can include at least one computation resource, server, processor or memory. For example, service provider device 134 can include a plurality of computation resources or servers located in at least one data center. The service provider device 134 can include one or more component or functionality of the data processing system 130.

The content source computing device 108 can provide audio based content items for display by the client computing device 102 as an audio output content item. The content item can include an offer for a good or service, such as a voice based message that states: "Would you like me to order you a taxi?" For example, the content provider computing device 154 can include memory to store a series of audio content items that can be provided in response to a voice based query. The content source computing device 108 can also provide audio based content items (or other content items) to the data processing system 130 where they can be stored in the data repository 141. The data processing system 130 can select the audio content items and provide (or instruct the content provider computing device 131 to provide) the audio content items to the client computing device 102. The audio based content items can be exclusively audio or can be combined with text, image, or video data.

The service provider device 134 can include, interface, or otherwise communicate with at least one service provider natural language processor component 150 and a service provider interface 151. The service provider computing device 134 can include at least one service provider natural language processor (NLP) component 150 and at least one service provider interface 151. The service provider NLP component 150 (or other components such as a direct action API of the service provider computing device 134) can engage with the client computing device 102 (via the data processing system 130 or bypassing the data processing system 130) to create a back-and-forth real-time voice or audio based conversation (e.g., a session) between the client computing device 102 and the service provider computing device 134. The service provider NLP 150 can include one or more function or feature as the NLP component 136 of the data processing system 130. For example, the service provider interface 151 can receive or provide data messages to the direct action API 138 of the data processing system 130.

The service provider computing device 134 and the content source computing device 108 can be associated with the same entity. For example, the content source computing device 108 can create, store, or make available content items for a car sharing service, and the service provider computing device 134 can establish a session with the client computing device 102 to arrange for a delivery of a taxi or car of the car share service to pick up the end user of the client computing device 102. The data processing system 130, via the direct action API 138, the NLP component 136 or other components can also establish the session with the client computing device, including or bypassing the service provider computing device 131, to arrange for example for a delivery of a taxi or car of the car share service.

The computing device 131 can include, interface, or otherwise communicate with at least one sensor 146, transducer 147, audio driver 148, or pre-processor 149. The sensor 146 can include, for example, an ambient light sensor, proximity sensor, temperature sensor, accelerometer, gyroscope, motion detector, GPS sensor, location sensor, microphone, or touch sensor. The transducer 147 can include a speaker or a microphone. The audio driver 148 can provide a software interface to the hardware transducer 147. The audio driver can execute the audio file or other instructions provided by the data processing system 130 to control the transducer 147 to generate a corresponding acoustic wave or sound wave. The pre-processor 149 can be configured to detect a keyword and perform an action based on the keyword. The pre-processor 149 can filter out one or more terms or modify the terms prior to transmitting the terms to the data processing system 130 for further processing. The pre-processor 149 can convert the analog audio signals detected by the microphone into a digital audio signal, and transmit one or more data packets carrying the digital audio signal to the data processing system 130 via the network 106. In some cases, the pre-processor 149 can transmit data packets carrying some or all of the input audio signal responsive to detecting an instruction to perform such transmission. The instruction can include, for example, a trigger keyword or other keyword or approval to transmit data packets comprising the input audio signal to the data processing system 130.

The client computing device 102 can be associated with an end user that enters voice queries as audio input into the client computing device 102 (via the sensor 146) and receives audio output in the form of a computer generated voice that can be provided from the data processing system 130 (or the content source computing device 108 or the service provider computing device 134) to the client computing device 102, output from the transducer 147 (e.g., a speaker). The computer generated voice can include recordings from a real person or computer generated language.

The data repository 141 can include one or more local or distributed databases, and can include a database management system. The data repository can be stored in the memory 122 of the search service 104. The data repository 141 can include computer data storage or memory and can store one or more parameters 142, one or more policies 143, content data 144, or templates 145 among other data. The parameters 142, policies 143, and templates 145 can include information such as rules about a voice based session between the client computing device 102 and the data processing system 130 (or the service provider computing device 134). The content data 144 can include content items for audio output or associated metadata, as well as input audio messages that can be part of one or more communication sessions with the client computing device 102.

The data processing system 130 can include a content placement system having at least one computation resource or server. The data processing system 130 can include, interface, or otherwise communicate with at least one interface 135. The data processing system 130 can include, interface, or otherwise communicate with at least one natural language processor component 136. The data processing system 130 can include, interface, or otherwise communicate with at least one direct action application programming interface ("API") 116. The data processing system 130 can include, interface, or otherwise communicate with at least one session handler 137. The data processing system 130 can include, interface, or otherwise communicate with at least one content selector component 139. The data processing system 130 can include, interface, or otherwise communicate with at least one audio signal generator 140. The data processing system 130 can include, interface, or otherwise communicate with at least one data repository 141. The at least one data repository 141 can include or store, in one or more data structures or databases, parameters 142, policies 143, content data 144, or templates 145. Parameters 142 can include, for example, thresholds, distances, time intervals, durations, scores, or weights. Content data 144 can include, for example, content campaign information, content groups, content selection criteria, content item objects or other information provided by a content source device 108 or obtained or determined by the data processing system to facilitate content selection. The content data 144 can include, for example, historical performance of a content campaign.

The interface 135, natural language processor component 136, session handler 137, direct action API 138, content selector component 139, or audio signal generator component 140 can each include at least one processing unit or other logic device such as programmable logic array engine, or module configured to communicate with the database repository or database 141. The interface 135, natural language processor component 136, session handler 137, direct action API 138, content selector component 139, audio signal generator component 140 and data repository 141 can be separate components, a single component, or part of the data processing system 130. The system 100 and its components, such as a data processing system 130, can include hardware elements, such as one or more processors, logic devices, or circuits.

The data processing system 130 can obtain anonymous computer network activity information associated with a plurality of computing devices 131. A user of a computing device 131 can affirmatively authorize the data processing system 130 to obtain network activity information corresponding to the user's computing device 131. For example, the data processing system 130 can prompt the user of the computing device 131 for consent to obtain one or more types of network activity information. The identity of the user of the computing device 131 can remain anonymous and the computing device 131 can be associated with a unique identifier (e.g., a unique identifier for the user or the computing device provided by the data processing system or a user of the computing device). The data processing system can associate each observation with a corresponding unique identifier.

A content source device 108 can establish an electronic content campaign. The electronic content campaign can be stored as content data 144 in data repository 141. An electronic content campaign can refer to one or more content groups that correspond to a common theme. A content campaign can include a hierarchical data structure that includes content groups, content item data objects, and content selection criteria. To create a content campaign, content source device 108 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 130 or content source device 108), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 131. In some cases, an impression can refer to a viewable or audible impression; e.g., the content item object is at least partially (e.g., 20%, 30%, 30%, 40%, 50%, 60%, 70%, or more) viewable on a display device of the client computing device 102, or audible via a speaker 147 of the computing device 131. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content source device 108 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content source device 108 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content source device 108 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content source device 108 can provide one or more keywords to be used by the data processing system 130 to select a content item object provided by the content source device 108. The content source device 108 can identify one or more keywords to bid on, and further provide bid amounts for various keywords. The content source device 108 can provide additional content selection criteria to be used by the data processing system 130 to select content item objects. multiple content sources 108 can bid on the same or different keywords, and the data processing system 130 can run a content selection process or ad auction responsive to receiving an indication of a keyword of an electronic message.

The content source device 108 can provide one or more content item objects for selection by the data processing system 130. The data processing system 130 (e.g., via content selector component 139) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 130 can transmit the content item object for rendering on a computing device 131 or display device of the computing device 131. Rendering can include displaying the content item on a display device, or playing the content item via a speaker of the computing device 131. The data processing system 130 can provide instructions to a computing device 131 to render the content item object. The data processing system 130 can instruct the computing device 131, or an audio driver 148 of the computing device 131, to generate audio signals or acoustic waves.

The data processing system 130 can include an interface component 135 designed, configured, constructed, or operational to receive and transmit information using, for example, data packets. The interface 135 can receive and transmit information using one or more protocols, such as a network protocol. The interface 135 can include a hardware interface, software interface, wired interface, or wireless interface. The interface 135 can facilitate translating or formatting data from one format to another format. For example, the interface 135 can include an application programming interface that includes definitions for communicating between various components, such as software components.

The data processing system 130 can include an application, script or program installed at the client computing device 102, such as an app to communicate input audio signals to the interface 135 of the data processing system 130 and to drive components of the client computing device to render output audio signals. The data processing system 130 can receive data packets or other signal that includes or identifies an audio input signal. For example, the data processing system 130 can execute or run the NLP component 136 to receive or obtain the audio signal and parse the audio signal. For example, the NLP component 136 can provide for interactions between a human and a computer. The NLP component 136 can be configured with techniques for understanding natural language and allowing the data processing system 130 to derive meaning from human or natural language input. The NLP component 136 can include or be configured with technique based on machine learning, such as statistical machine learning. The NLP component 136 can utilize decision trees, statistical models, or probabilistic models to parse the input audio signal. The NLP component 136 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 136 converts the audio input signal into recognized text by comparing the input signal against a stored, representative set of audio waveforms (e.g., in the data repository 141) and choosing the closest matches. The set of audio waveforms can be stored in data repository 141 or other database accessible to the data processing system 130. The representative waveforms are generated across a large set of users, and then may be augmented with speech samples from the user. After the audio signal is converted into recognized text, the NLP component 136 matches the text to words that are associated, for example via training across users or through manual specification, with actions that the data processing system 130 can serve.

The audio input signal can be detected by the sensor 146 or transducer 147 (e.g., a microphone) of the client computing device 102. Via the transducer 147, the audio driver 148, or other components the client computing device 102 can provide the audio input signal to the data processing system 130 (e.g., via the network 106) where it can be received (e.g., by the interface 135) and provided to the NLP component 136 or stored in the data repository 141.

The NLP component 136 can obtain the input audio signal. From the input audio signal, the NLP component 136 can identify at least one request or at least one trigger keyword corresponding to the request. The request can indicate intent or subject matter of the input audio signal. The trigger keyword can indicate a type of action likely to be taken. For example, the NLP component 136 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. The NLP component 136 can also determine a search result and a search entity based on the at least trigger keyword.

The NLP component 136 can parse the input audio signal to identify, determine, retrieve, or otherwise obtain the request and the trigger keyword. For instance, the NLP component 136 can apply a semantic processing technique to the input audio signal to identify the trigger keyword or the request. The NLP component 136 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 136 can apply a semantic processing technique, or other natural language processing technique, to the data packets comprising the sentence to identify trigger phrases "do my laundry" and "do my dry cleaning". The NLP component 136 can further identify multiple trigger keywords, such as laundry, and dry cleaning. For example, the NLP component 136 can determine that the trigger phrase includes the trigger keyword and a second trigger keyword.

The NLP component 136 can filter the input audio signal to identify the trigger keyword. For example, the data packets carrying the input audio signal can include "It would be great if I could get someone that could help me go to the airport", in which case the NLP component 136 can filter out one or more terms as follows: "it", "would", "be", "great", "if", "I", "could", "get", "someone", "that", "could", or "help". By filtering out these terms, the NLP component 136 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 136 can determine this is a request for a laundry service and a dry cleaning service. The NLP component 136 can determine this is a single request for a service provider that can provide both laundry services and dry cleaning services. The NLP component 136 can determine that this is two requests; a first request for a service provider that performs laundry services, and a second request for a service provider that provides dry cleaning services. In some cases, the NLP component 136 can combine the multiple determined requests into a single request, and transmit the single request to a service provider device 134. In some cases, the NLP component 136 can transmit the individual requests to respective service provider devices 134, or separately transmit both requests to the same service provider device 134.

The data processing system 130 can include a direct action API 138 designed and constructed to generate, based on the trigger keyword, an action data structure and one or more entity-action pairs responsive to the request. Processors of the data processing system 130 can invoke the direct action API 138 to execute scripts that generate a data structure to a service provider device 134 to request or order a service or product, such as a car from a car share service. The direct action API 138 can obtain data from the data repository 141, as well as data received with end user consent from the client computing device 102 to determine location, time, user accounts, logistical or other information to allow the service provider device 134 to perform an operation, such as reserve a car from the car share service. Using the direct action API 138, the data processing system 130 can also communicate with the service provider device 134 to complete the conversion by in this example making the car share pick up reservation.

The direct action API 138 can execute a specified action to satisfy the end user's intention, as determined by the data processing system 130. The action can be associated with the user's input (or the trigger keyword, search entity, or other keywords) to form an entity-action pair. Depending on the action specified in its inputs, the direct action API 138 can execute code or a dialog script that identifies the parameters required to fulfill a user request. Such code can look-up additional information, e.g., in the data repository 141, such as the name of a home automation service, or it can provide audio output for rendering at the client computing device 102 to ask the end user questions such as the intended destination of a requested taxi. The direct action API 138 can determine necessary parameters and can package the information into an action data structure, which can then be sent to another component such as the content selector component 139 or to the service provider computing device 134 to be fulfilled.

The direct action API 138 can receive an instruction or command from the NLP component 136, or other component of the data processing system 130, to generate or construct the action data structure. The direct action API 138 can determine a type of action in order to select a template from the template repository 145 stored in the data repository 141. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 138, upon identifying the type of request, can access the corresponding template from the template repository 145. Templates can include fields in a structured data set that can be populated by the direct action API 138 to further the operation that is requested of the service provider device 134 (such as the operation of sending a taxi to pick up an end user at a pickup location and transport the end user to a destination location). The direct action API 138 can perform a lookup in the template repository 145 to select the template that matches one or more characteristic of the trigger keyword and request. For example, if the request corresponds to a request for a car or ride to a destination, the data processing system 130 can select a car sharing service template. The car sharing service template can include one or more of the following fields: device identifier, pick up location, destination location, number of passengers, or type of service. The direct action API 138 can populate the fields with values. To populate the fields with values, the direct action API 138 can ping, poll or otherwise obtain information from one or more sensors 146 of the computing device 131 or a user interface of the device 131. For example, the direct action API 138 can detect the source location using a location sensor, such as a GPS sensor. The direct action API 138 can obtain further information by submitting a survey, prompt, or query to the end of user of the computing device 131. The direct action API can submit the survey, prompt, or query via interface 135 of the data processing system 130 and a user interface of the computing device 131 (e.g., audio interface, voice-based user interface, display, or touch screen). Thus, the direct action API 138 can select a template for the action data structure based on the trigger keyword or the request, populate one or more fields in the template with information detected by one or more sensors 146 or obtained via a user interface, and generate, create or otherwise construct the action data structure to facilitate performance of an operation by the service provider device 134.

The data processing system 130 can select the template based from the template data structure 145 based on various factors including, for example, one or more of the trigger keyword, request, third-party provider device 134, type of third-party provider device 134, a category that the third-party provider device 134 falls in (e.g., taxi service, laundry service, flower service, or food delivery), location, or other sensor information.

To select the template based on the trigger keyword, the data processing system 130 (e.g., via direct action API 138) can perform a look-up or other query operation on the template database 145 using the trigger keyword to identify a template data structure that maps or otherwise corresponds to the trigger keyword. For example, each template in the template database 145 can be associated with one or more trigger keywords to indicate that the template is configured to generate an action data structure responsive to the trigger keyword that the third-party provider device 134 can process to establish a communication session.

In some cases, the data processing system 130 can identify a third-party provider device 134 based on the trigger keyword. To identify the third-party provider 108 based on the trigger keyword, the data processing system 130 can perform a lookup in the data repository 141 to identify a third-party provider device 134 that maps to the trigger keyword. For example, if the trigger keyword includes "ride" or "to go to", then the data processing system 130 (e.g., via direct action API 138) can identify the third-party provider device 134 as corresponding to Taxi Service Company A. The data processing system 130 can select the template from the template database 145 using the identify third-party provider device 134. For example, the template database 145 can include a mapping or correlation between third-party provider devices 134 or entities to templates configured to generate an action data structure responsive to the trigger keyword that the third-party provider device 134 can process to establish a communication session. In some cases, the template can be customized for the third-party provider device 134 or for a category of third-party provider devices 134. The data processing system 130 can generate the action data structure based on the template for the third-party provider 134.

To construct or generate the action data structure, the data processing system 130 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 130 can identify the values for the fields to populate the fields of the template to create the action data structure. The data processing system 130 can obtain, retrieve, determine or otherwise identify the values for the fields by performing a look-up or other query operation on the data repository 141.

In some cases, the data processing system 130 can determine that the information or values for the fields are absent from the data repository 141. The data processing system 130 can determine that the information or values stored in the data repository 141 are out-of-date, stale, or otherwise not suitable for the purpose of constructing the action data structure responsive to the trigger keyword and request identified by the NLP component 136 (e.g., the location of the client computing device 102 may be the old location and not be the current location; an account can be expired; the destination restaurant may have moved to a new location; physical activity information; or mode of transportation).

If the data processing system 130 determines that it does not currently have access, in memory of the data processing system 130, to the values or information for the field of the template, the data processing system 130 can acquire the values or information. The data processing system 130 can acquire or obtain the information by querying or polling one or more available sensors of the client computing device 102, prompting the end user of the client computing device 102 for the information, or accessing an online web-based resource using an HTTP protocol. For example, the data processing system 130 can determine that it does not have the current location of the client computing device 102, which may be a needed field of the template. The data processing system 130 can query the client computing device 102 for the location information. The data processing system 130 can request the client computing device 102 to provide the location information using one or more location sensors 146, such as a Global Positioning System sensor, WIFI triangulation, cell tower triangulation, Bluetooth beacons, IP address, or other location sensing technique.

The direct action API 138 can transmit the action data structure to a third-party provider device (e.g., service provider device 134) to cause the third-party provider device 134 to invoke a conversational application programming interface (e.g., service provider NLP component 150) and establish a communication session between the third-party provider device 134 and the client computing device 102. Responsive to establishing the communication session between the service provider device 134 and the client computing device 1004, the service provider device 134 can transmit data packets directly to the client computing device 102 via network 106. In some cases, the service provider device 134 can transmit data packets to the client computing device 102 via data processing system 130 and network 106.

In some cases, the third-party provider device 134 can execute at least a portion of the conversational API 150. For example, the third-party provider device 134 can handle certain aspects of the communication session or types of queries. The third-party provider device 134 may leverage the NLP component 136 executed by the data processing system 130 to facilitate processing the audio signals associated with the communication session and generating responses to queries. In some cases, the data processing system 130 can include the conversational API 150 configured for the third-party provider 134. In some cases, the data processing system routes data packets between the client computing device and the third-party provider device to establish the communication session. The data processing system 130 can receive, from the third-party provider device 134, an indication that the third-party provider device established the communication session with the client device 131. The indication can include an identifier of the client computing device 102, timestamp corresponding to when the communication session was established, or other information associated with the communication session, such as the action data structure associated with the communication session.

In some cases, the conversational API can be a second NLP that includes one or more component or function of the first NLP 136. The second NLP 150 can interact or leverage the first NLP 136. In some cases, the system 100 can include a single NLP 136 executed by the data processing system 130. The single NLP 136 can support both the data processing system 130 and the third-party service provider device 134. In some cases, the direct action API 138 generates or construct an action data structure to facilitate performing a service, and the conversational API generates responses or queries to further a communication session with an end user or obtain additional information to improve or enhance the end user's experience or performance of the service.

The data processing system 130 can include, execute, access, or otherwise communicate with a session handler component 137 to establish a communication session between the client device 131 and the data processing system 130. The communication session can refer to one or more data transmissions between the client device 131 and the data processing system 130 that includes the input audio signal that is detected by a sensor 146 of the client device 131, and the output signal transmitted by the data processing system 130 to the client device 131. The data processing system 130 (e.g., via the session handler component 137) can establish the communication session responsive to receiving the input audio signal. The data processing system 130 can set a duration for the communication session. The data processing system 130 can set a timer or a counter for the duration set for the communication session. Responsive to expiration of the timer, the data processing system 130 can terminate the communication session.

The communication session can refer to a network-based communication session in which the client device 131 provides authenticating information or credentials to establish the session. In some cases, the communication session refers to a topic or a context of audio signals carried by data packets during the session. For example, a first communication session can refer to audio signals transmitted between the client device 131 and the data processing system 130 that are related to (e.g., include keywords, action data structures, or content item objects) a taxi service; and a second communication session can refer to audio signals transmitted between the client device 131 and data processing system 130 that are related to a laundry and dry cleaning service. In this example, the data processing system 130 can determine that the context of the audio signals is different (e.g., via the NLP component 136), and separate the two sets of audio signals into different communication sessions. The session handler 137 can terminate the first session related to the ride service responsive to identifying one or more audio signals related to the dry cleaning and laundry service. Thus, the data processing system 130 can initiate or establish the second session for the audio signals related to the dry cleaning and laundry service responsive to detecting the context of the audio signals.

The data processing system 130 can include, execute, or otherwise communicate with a content selector component 139 to receive the trigger keyword identified by the natural language processor and select, based on the trigger keyword, a content item via a real-time content selection process. The content selection process can refer to, or include, selecting sponsored content item objects provided by third-party content sources 108. The real-time content selection process can include a service in which content items provided by multiple content providers are parsed, processed, weighted, or matched in order to select one or more content items to provide to the computing device 131. The content selector component 139 can perform the content selection process in real-time. Performing the content selection process in real-time can refer to performing the content selection process responsive to the request for content received via the client computing device 102. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 102, or within a time interval after the communication session is terminated.

For example, the data processing system 130 can include a content selector component 139 designed, constructed, configured or operational to select content item objects. To select content items for display in a voice-based environment, the data processing system 130 (e.g., via NLP component 136) can parse the input audio signal to identify keywords (e.g., a trigger keyword), and use the keywords to select a matching content item based on a broad match, exact match, or phrase match. For example, the content selector component 139 can analyze, parse, or otherwise process subject matter of candidate content items to determine whether the subject matter of the candidate content items correspond to the subject matter of the keywords or phrases of the input audio signal detected by the microphone of the client computing device 102. The content selector component 139 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 139 may process the metadata to determine whether the subject matter of the candidate content item corresponds to the input audio signal.

content sources 108 may provide additional indicators when setting up a content campaign that includes content items. The content source device 108 may provide information at the content campaign or content group level that the content selector component 139 may identify by performing a lookup using information about the candidate content item. For example, the candidate content item may include a unique identifier, which may map to a content group, content campaign, or content provider. The content selector component 139 may determine, based on information stored in content campaign data structure in data repository 141, information about the content source device 108.

The data processing system 130 can receive, via a computer network, a request for content for presentation on a computing device 131. The data processing system 130 can identify the request by processing an input audio signal detected by a microphone of the client computing device 102. The request can include selection criteria of the request, such as the device type, location, and a keyword associated with the request. The request can include the action data structure or action data structure.

Responsive to the request, the data processing system 130 can select a content item object from data repository 141 or a database associated with the content source device 108, and provide the content item for presentation via the computing device 131 via network 106. The content item object can be provided by a content provider device 134 different from the service provider device 134. The content item can correspond to a type of service different from a type of service of the action data structure (e.g., taxi service versus food delivery service). The computing device 131 can interact with the content item object. The computing device 131 can receive an audio response to the content item. The computing device 131 can receive an indication to select a hyperlink or other button associated with the content item object that causes or allows the computing device 131 to identify service provider 134, request a service from the service provider 134, instruct the service provider 134 to perform a service, transmit information to the service provider 134, or otherwise query the service provider device 134.

The data processing system 130 can include, execute, or communicate with an audio signal generator component 140 to generate an output signal. The output signal can include one or more portions. For example, the output signal can include a first portion and a second portion. The first portion of the output signal can correspond to the action data structure. The second portion of the output signal can correspond to the content item selected by the content selector component 139 during the real-time content selection process.

The audio signal generator component 140 can generate the output signal with a first portion having sound corresponding to the first data structure. For example, the audio signal generator component 140 can generate the first portion of the output signal based on one or more values populated into the fields of the action data structure by the direct action API 138. In a taxi service example, the values for the fields can include, for example, 123 Main Street for pick-up location, 1234 Main Street for destination location, 2 for number of passengers, and economy for the level of service. The audio signal generator component 140 can generate the first portion of the output signal in order to confirm that the end user of the computing device 131 wants to proceed with transmitting the request to the service provider 134. The first portion can include the following output "Would you like to order an economy car from taxi service provider A to pick two people up at 123 Main Street and drop off at 1234 Main Street?"

In some cases, the first portion can include information received from the service provider device 134. The information received from service provider device 134 can be customized or tailored for the action data structure. For example, the data processing system 130 (e.g., via direct action API 138) can transmit the action data structure to the service provider 134 before instructing the service provider 134 to perform the operation. Instead, the data processing system 130 can instruct the service provider device 134 to perform initial or preliminary processing on the action data structure to generate preliminary information about the operation. In the example of the taxi service, the preliminary processing on the action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 134 can return the preliminary information to the data processing system 130 or directly to the client computing device 102 via the network 131. The data processing system 130 can incorporate the preliminary results from the service provider device 134 into the output signal, and transmit the output signal to the computing device 131. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 130 can form a second portion of the output signal. The second portion of the output signal can include a content item selected by the content selector component 139 during a real-time content selection process. The first portion can be different from the second portion. For example, the first portion can include information corresponding to the action data structure that is directly responsive to the data packets carrying the input audio signal detected by the sensor 146 of the client computing device 102, whereas the second portion can include a content item selected by a content selector component 131 that can be tangentially relevant to the action data structure, or include sponsored content provided by a content source device 108. For example, the end user of the computing device 131 can request a taxi from Taxi Service Company A. The data processing system 130 can generate the first portion of the output signal to include information about the taxi from the Taxi Service Company A. However, the data processing system 130 can generate the second portion of the output signal to include a content item selected based on the keywords "taxi service" and information contained in the action data structure that the end user may be interested in. For example, the second portion can include a content item or information provided by a different taxi service company, such as Taxi Service Company B. While the user may not have specifically requested Taxi Service Company B, the data processing system 130 may nonetheless provide a content item from Taxi Service Company B because the user may choose to perform an operation with Taxi Service Company B.

The data processing system 130 can transmit information from the action data structure to the Taxi Service Company B to determine a pick-up time, time of arrival at the destination, and a price for the ride. The data processing system 130 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of computing device 131 can then select the ride provided by Taxi Service Company A or the ride provided by Taxi Service Company B.

Prior to providing, in the second portion of the output signal, the sponsored content item corresponding to the service provided by Taxi Service Company B, the data processing system 130 can notify the end user computing device that the second portion corresponds to a content item object selected during a real-time content selection process (e.g., by the content selector component 139). However, the data processing system 130 can have limited access to different types of interfaces to provide the notification to the end user of the computing device 131. For example, the computing device 131 may not include a display device, or the display device may be disabled or turned off. The display device of the computing device 131 may consume greater resources than the speaker of the computing device 131, so it may be less efficient to turn on the display device of the computing device 131 as compared to using the speaker of the computing device 131 to convey the notification. Thus, in some cases, the data processing system 130 can improve the efficiency and effectiveness of information transmission over one or more interfaces or one or more types of computer networks. For example, the data processing system 130 (e.g., via the audio signal generator component 140) can module the portion of the output audio signal comprising the content item to provide the indication or notification the end user that that portion of the output signal comprises the sponsored content item.

The data processing system 130 (e.g., via interface 135 and network 106) can transmit data packets comprising the output signal generated by the audio signal generator component 140. The output signal can cause the audio driver component 148 of or executed by the client device 131 to drive a speaker (e.g., transducer 147) of the client device 131 to generate an acoustic wave corresponding to the output signal.

Figure 1C:
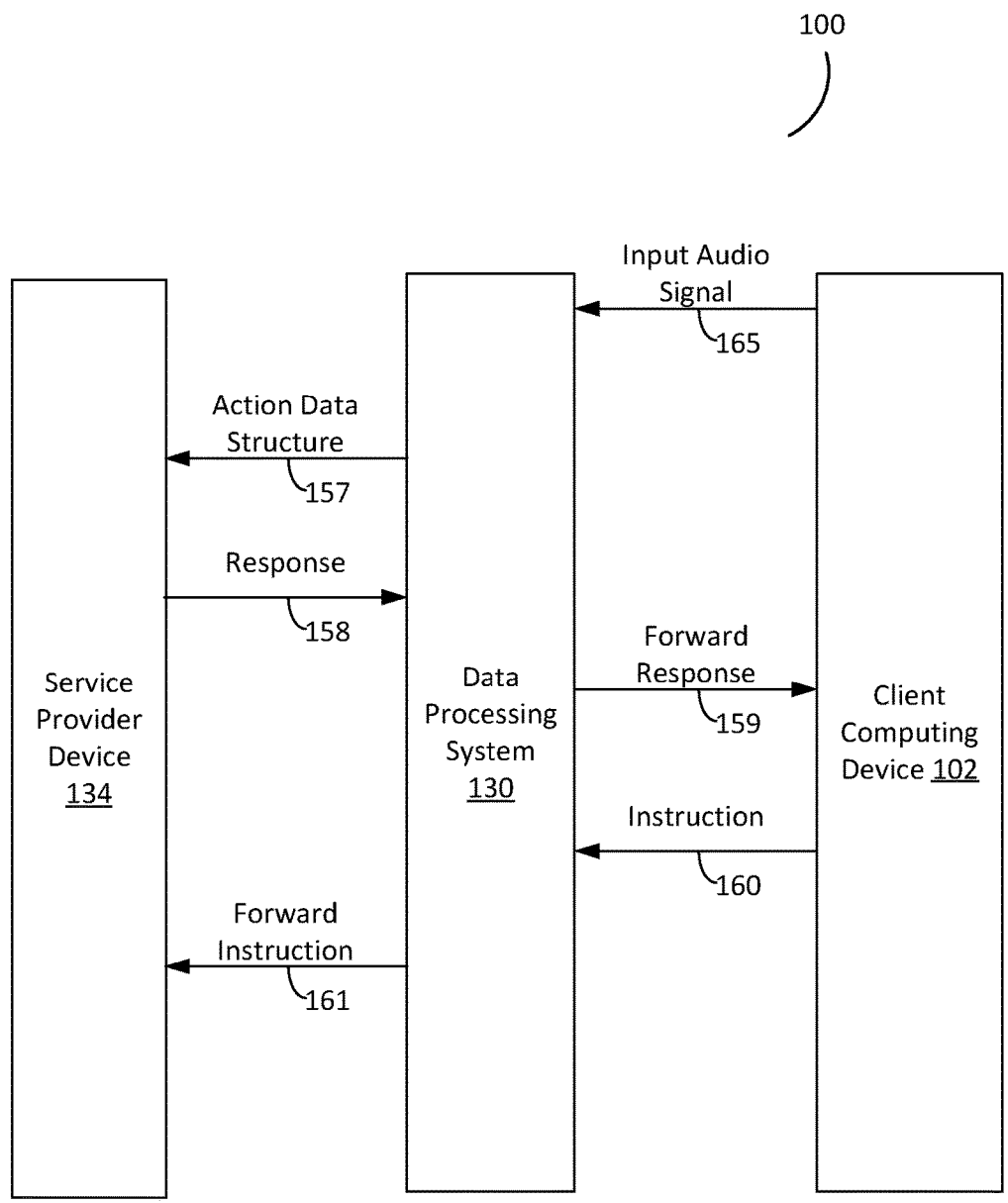
FIG. 1C is an illustration of an operation of a system to route packetized actions via a computer network.

FIG. 1C is an illustration of the system 100 to route packetized actions via a computer network. The system can include one or more component of system 100 depicted in FIG. 1B. At ACT 165, the client computing device 102 can transmit data packets carrying the input audio signal detected by a microphone or other sensor of the computing device 131. The client computing device 102 can transmit the input audio signal to the data processing system 130. The data processing system 130 can parse the input audio signal to identify a keyword, request or other information to generate an action data structure responsive to the request.

At ACT 157, the data processing system 130 can transmit the action data structure to the service provider device 134 (or third-party provider device 134). The data processing system 130 can transmit the action data structure via a network. The service provider device 134 can include an interface configured to receive and process the action data structure transmitted by the data processing system 130.

The service provider device 134 (e.g., via a conversational API) can respond to the action data structure at ACT 158. The response from the service provider device 134 can include an indication of a service to perform corresponding to the action data structure. The response can include a confirmation to proceed with performing the operation. The response can include a request for further information to perform the operation corresponding to the action data structure. For example, the action data structure can be for a ride, and the service provider 134 can respond with a request for further information such as a number of passengers for the ride, a type of car desired by the passenger, desired amenities in the car, or preferred pick up location. The request for additional information can include information that may not be present in the action data structure. For example, the action data structure can include baseline information to perform the operation, such as the pick-up location, destination location, and number of passengers. The baseline information can be the standard data set used by a plurality of service providers 134 within the taxi service category. However, a certain taxi service provider 134 can choose to customize and improve the operation by requesting additional information or preferences from the client computing device 102.

The service provider device 134 can transmit one or more data packets carrying the response to the data processing system 130 at ACT 158. The data processing system 130 can parse the data packets and identify a source of the data packets and a destination for the data packets. At ACT 159, the data processing system 130 can, accordingly, route or forward the data packets to the client computing device 102. The data processing system 130 can route or forward the data packets via network 106.

At ACT 160, the client computing device 102 can transmit an instruction or command to the data processing system 130 based on the forwarded response. For example, the response forwarded at 225 can be a request for a number of passengers and a confirmation to proceed with scheduling the taxi ride. The instruction at 225 can include the number of passengers and the instruction to proceed with scheduling the pickup. The client device 131 can transmit one or more data packets carrying the instruction to the data processing system 130. The data processing system 130 can route or forward the data packets carrying the instructions to the service provider device 134 at ACT 161.

In some cases, the data processing system 130 can route or forward the data packets at ACT 159 or ACT 161 as-is (e.g., without manipulating the data packets). In some cases, the data processing system 130 can process the data packets to filter out information, or encapsulate the data packets with information to facilitate processing of the data packets by the service provider device 134 or the client computing device 102. For example, the data processing system 130 can mask, hide, or protect the identity of the client computing device 102 from the service provider device 134. Thus, the data processing system 130 can encrypt identifying information using a hash function such that the service provider 134 cannot directly identify a device identifier or username of the client computing device 102. The data processing system 130 can maintain a mapping of the proxy identifier provided to the service provider device 134 for use during the communication session to the identifier or username of the client computing device 102.

Figure 1D:
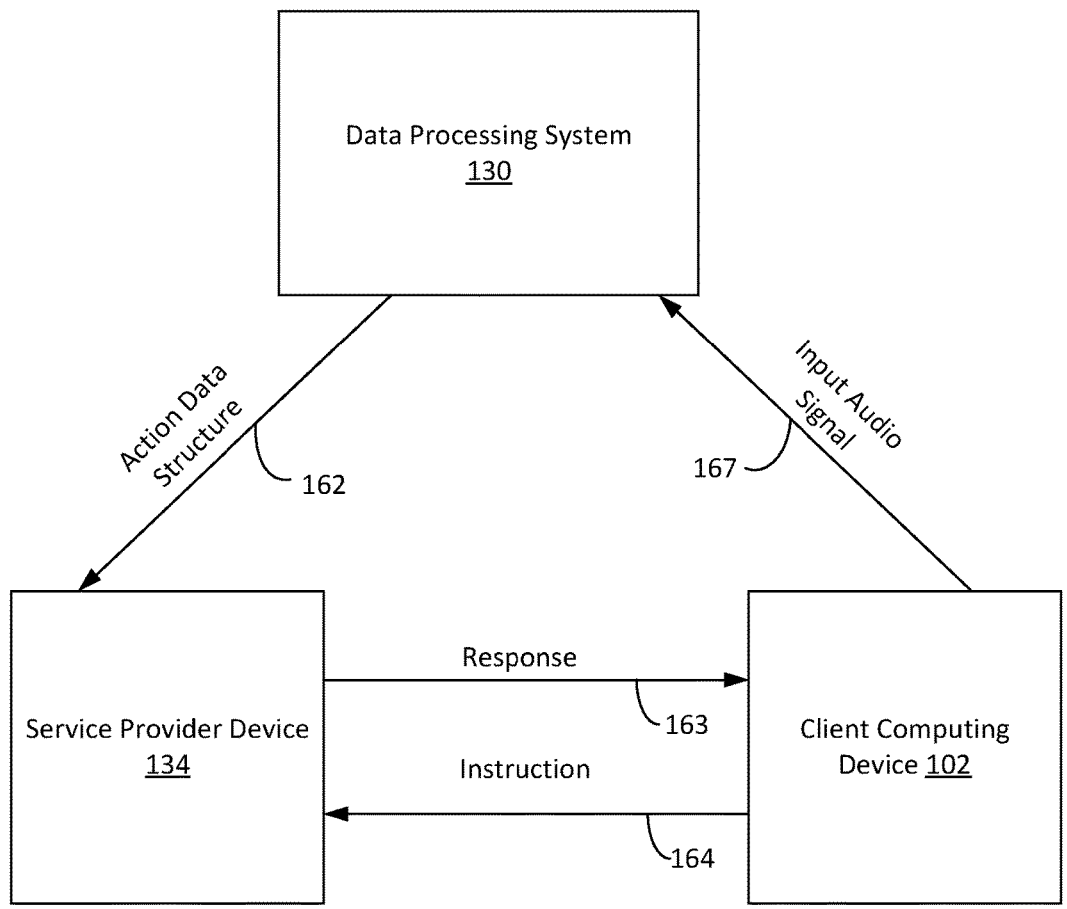
FIG. 1D is an illustration of an operation of a system to route packetized actions via a computer network.

FIG. 1D is an illustration of the system 100 to route packetized actions via a computer network. The system can include one or more component of system 100 depicted in FIG. 1B. At ACT 166, the client computing device 102 can transmit data packets carrying the input audio signal detected by a microphone or other sensor of the computing device 131. The client computing device 102 can transmit the input audio signal to the data processing system 130. The data processing system 130 can parse the input audio signal to identify a keyword, request or other information to generate an action data structure responsive to the request.

At ACT 162, the data processing system 130 can transmit the action data structure to the service provider device 134 (or third-party provider device 134). The data processing system 130 can transmit the action data structure via a network. The service provider device 134 can include an interface configured to receive and process the action data structure transmitted by the data processing system 130.

The service provider device 134 (e.g., via a conversational API) can respond to the action data structure at ACT 163. The response from the service provider device 134 can include an indication of a service to perform corresponding to the action data structure. The response can include a confirmation to proceed with performing the operation. The response can include a request for further information to perform the operation corresponding to the action data structure. For example, the action data structure can be for a ride, and the service provider 134 can respond with a request for further information such as a number of passengers for the ride, a type of car desired by the passenger, desired amenities in the car, or preferred pick up location. The request for additional information can include information that may not be present in the action data structure. For example, the action data structure can include baseline information to perform the operation, such as the pick-up location, destination location, and number of passengers. The baseline information can be the standard data set used by a plurality of service providers 134 within the taxi service category. However, a certain taxi service provider 134 can choose to customize and improve the operation by requesting additional information or preferences from the client computing device 102.

The service provider device 134 can transmit one or more data packets carrying the response directly to the client computing device 102 via a network 106. For example, instead of routing the response through the data processing system 130, the service provider device 134, via a conversational API executed by the service provider device 134, can respond directly to the client computing device 102. This can allow the service provider to customize the communication session.

At ACT 164, the client computing device 102 can transmit an instruction or command to service provider device 134 based on the response. For example, the response provided at 315 can be a request for a number of passengers and a confirmation to proceed with scheduling the taxi ride. The instruction at 320 can include the number of passengers and the instruction to proceed with scheduling the pickup. The client device 131 can transmit one or more data packets carrying the instruction to the service provider device 134 instead of routing the data packets through the data processing system 130.

The data processing system 130 can facilitate the service provider device 134 and the client computing device 102 establishing a communication session independent of the data processing system 130 by passing communication identifiers to the respective devices. For example, the data processing system 130 can forward an identifier of the device 131 to the device 134; and the data processing system 130 can forward an identifier of the device 134 to the device 131. Thus, the device 134 can establish the communication session directly with the device 131.

In some cases, the device 134 or device 131 can separately forward information, such as status information, about the communication session to the data processing system 130. For example, the device 134 can provide, to the data processing system, an indication that the device 134 successfully established the communication session with the client device 131.

Figure 2:
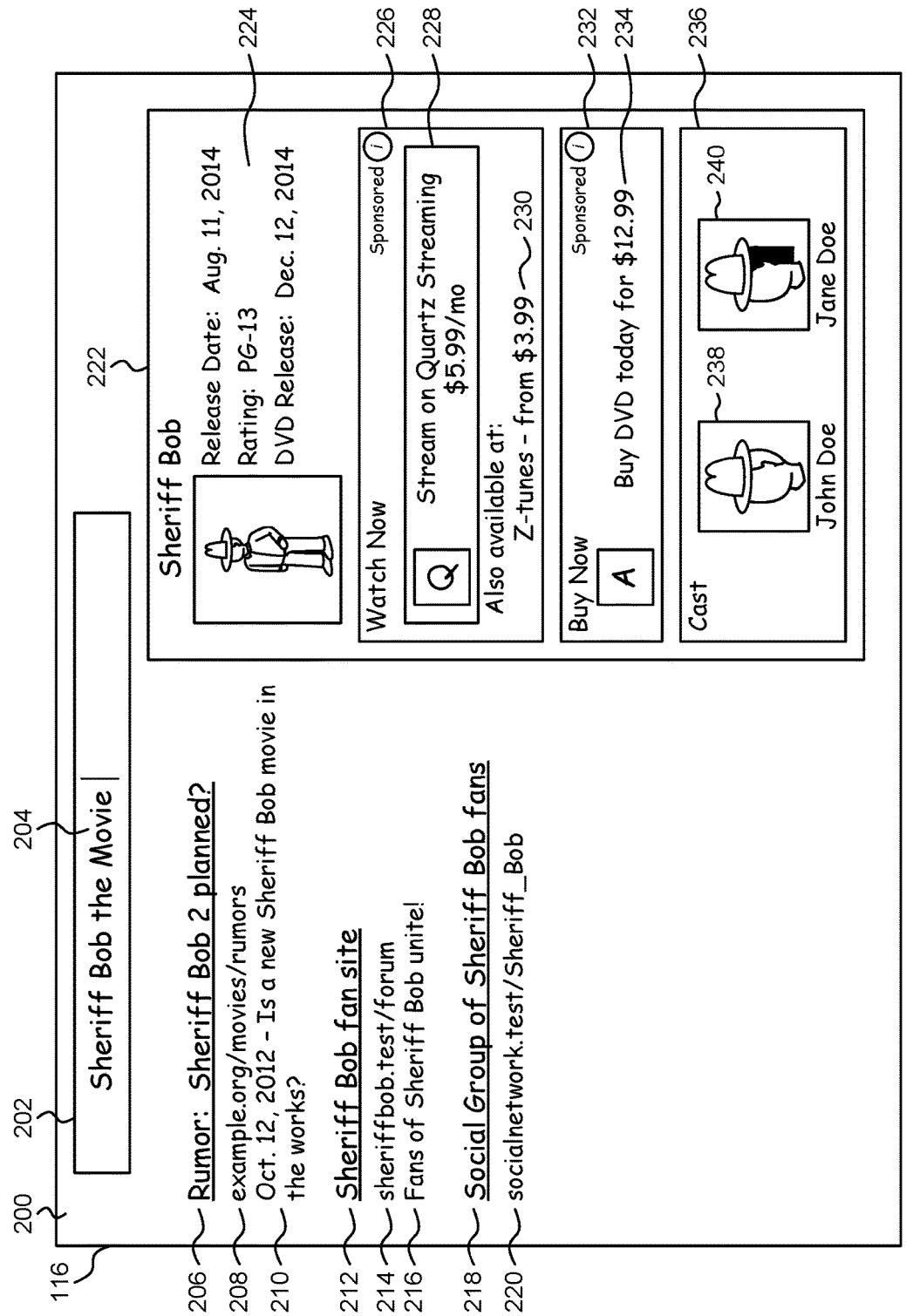
FIG. 2 illustrates an example illustration of an electronic display showing a search entity on a search result screen.

Referring now to FIG. 2, an illustration is shown of an electronic display showing a search entity on a search result screen, according to some implementations. In the example shown, search result screen 200 may be provided to the electronic display 116 of client device 102 in response to client device 102 sending a search query to search service 104. In some implementations, search result screen 200 may be a webpage provided by search service 104 to client device 102 and presented on electronic display 116 via an executed web browser application. In other implementations, search result screen 200 may be presented on electronic display 116 via a stand-alone application executed by client device 102.

A stand-alone application may be specifically configured to send search requests to search service 104 and to receive search results therefrom. Some or all of the content presented on search result screen 200 may be provided by search service 104 to client device 102, in various cases.

Search result screen 200 may include a search query input field 202 configured to receive a search query 204 from a user interface device. In some implementations, search query input field 202 may be presented directly on or with search result screen 200. For example, search results presented on search result screen 200 may be dynamically updated based on the current search query entered via input field 202 (e.g., changing search query 204 to be a different search query may cause different search results to be presented). In other implementations, search query input field 202 may be presented on a different screen than that of search result screen 200. For example, client device 102 may navigate from a search query screen to search result screen 200 in response to a search query being performed.

In the example shown, assume that the text "Sheriff Bob the Movie" has been entered into input field 202 as search query 204 and that a search has been initiated (e.g., in response to the Enter key being pressed on a keypad, in response to a pointing device selecting a search-related button, etc.). In response, search query 204 may be communicated to search service 104 and used by the service to retrieve any number of links to webpages or other online services related to search query 204. Search service 104 then may return the identified links and any corresponding data to client device 102 for presentation on search result screen 200. Search result screen 200 may include any number of hyperlinks for webpages or other online resources that relate to search query 204. For example, the highest ranked search result may correspond to a webpage that publishes rumors regarding a Sheriff Bob sequel, the second highest ranked search result may correspond to a webpage that allows fans of the Sheriff Bob movie to post messages, and the third highest ranked search result may be to a social networking group of Sheriff Bob fans. The search results may have hyperlinks 206, 212, 218, respectively, which are configured to redirect client device 102 to the webpages when clicked. In some cases, the search results may also have indications 208, 214, 220 of the network addresses associated with hyperlinks 206, 212, 218. For example, indication 208 on search result screen 200 may indicate that clicking hyperlink 206 will cause client device 102 to navigate to the webpage located at http://www.example.org/movies/rumors. In some implementations, additional information regarding the search results may also be presented as part of search result screen 200. For example, information 210, 216 may include information regarding when the webpage was last updated, a preview of text or images appearing on the webpage, or other such information.

In some cases, search service 104 may conduct a content auction using the keywords of search query 204 to select sponsored search results (e.g., third-party content that appears as normal search results). For example, one or more of hyperlinks 206, 212, 218 may be a sponsored link to the website of a third-party content provider. In this type of auction, third-party content providers place bids for the specific keywords of search query 204 or for a broad match of keywords specified by a third-party content provider.

According to various implementations, search service 104 may also use search query 204 to identify one or more search entities related to search query 204. For example, search service 104 may determine that search query 204 is most closely related to the search entity for the Sheriff Bob movie.

In some implementations, search service 104 may provide information regarding the identified search entity to client device 102 for presentation within a knowledge panel 222. For example, search service 104 may provide various facts 224 to client device 102 for presentation within knowledge panel 222. These facts may include general information about the Sheriff Bob search entity, such as when the movie was first released, the movie's rating, when the DVD of the movie was released, or other such information. In various implementations, a search entity may or may not be identified and presented by search service 104, depending on the search query. For example, a generic search for "new DVD releases" may not result in a search entity being identified. In some cases, a content auction for the specific keywords of the search query may still be conducted by search service 104 (e.g., to include one or more sponsored links with hyperlinks 206, 212, 218).

In addition to, or in lieu of, presenting facts 224 as part of knowledge panel 222, search service 104 may also select and provide additional content for presentation as part of knowledge panel 222 based on the relationships between the Sheriff Bob search entity, other search entities, and/or any online actions. In some cases, search service 104 may rank the related entities and/or actions based in part on search query 204. For example, search service 104 may determine that search query 204 does not include any search terms directly related to an online action, but that streaming Sheriff Bob and purchasing a DVD of the movie are the top two most popular online actions for the search entity. In such a case, search service 104 may conduct separate content auctions for the identified {Sheriff Bob, stream} and {Sheriff Bob, buy DVD} entity-action pairs. Links to the auction winners' websites or services may then be provided by search service 104 for presentation within knowledge panel 222. As shown, a first panel 226 may be presented as part of knowledge panel 222 based on the results of the auction for the {Sheriff Bob, stream} entity-action pair. Similarly, a second panel 232 may be presented as part of knowledge panel 222 based on the results of the auction for {Sheriff Bob, buy DVD} entity-action pair.

Each of panels 226, 232 may include third-party content from any number of different providers that have opted to associate their content with entity-action pairs. In some implementations, search service 104 may impose a maximum number of auction winners for each entity-action type. For example, the entity-action pair to stream the Sheriff Bob movie may allow third-party content to be presented by two different providers at once, while the entity-action pair to purchase the Sheriff Bob DVD may allow third-party content from a single provider to be presented at any given time. Each of panels 226, 232 may also include an indication that they contain third-party content. For example, panels 226, 232 may self-identify themselves as containing sponsored content, thereby distinguishing their third-party content from the first-party search results on screen 200.

Third-party content presented in panels 226, 232 may include hotlinks to their respective provider's websites or services, in some implementations. For example, panel 226 may include third-party content 228 (e.g., a link to one provider's streaming service) and third-party content 230 (e.g., another link to a different provider's streaming service). Similarly, panel 232 may include third-party content 234 (e.g., a link to a provider's retail website that sells the Sheriff Bob DVD). In some implementations, third-party content may also include additional information, such as a cost associated with the online action. Panels 226, 232 may include indicia regarding the name of the third-party content provider, a logo for the third-party content provider, a price associated with the provider's product or service, or other such information. For example, third-party content 228 may include the price to join its corresponding provider's streaming service (e.g., the streaming service costs $5.99 per month). In another example, third-party content 230 may include information regarding the cost to stream only the Sheriff Bob movie from another provider.

Search service 104 may determine that other search entities are related to the Sheriff Bob search entity and should be presented as part of knowledge panel 222. For example, assume that the Sheriff Bob movie stars the actor "John Doe" and the actress "Jane Doe." Each of these performers may have their own corresponding search entity. In such a case, search service 104 may also provide a panel 236 for presentation in knowledge panel 222 that includes search entities 238, 240 (e.g., links to the search entities for John Doe and Jane Doe, respectively). Selecting either of these links using an input device may cause knowledge panel 222 to be updated with the corresponding search entity and/or cause search query 204 to be updated and a new search conducted for the corresponding entity.

In some implementations, search service 104 may determine the visual layout of knowledge panel 222 and its constituent components based on search query 204. Search service 104 may determine how closely related an entity-action pair or other search entity is to search query 204, so that they can be ranked. For example, search service 104 may determine that search query 204 is broadly related to the search entity for the Sheriff Bob movie. Search service 104 may also determine how related any other entity-action pairs are to the search and/or any other search entities that may be related to the entity for the Sheriff Bob movie. Search service 104 may also determine the strength of these relationships based on how closely the search query matches the entities and entity-action pairs, on how often users click on the related entities and entity-action pairs when presented, or both. Using the strength of these relationships, search service 104 may select which search entity is to appear in knowledge panel 222, which entity-action pairs are to appear in knowledge panel 222 (e.g., which types of third-party content are to be presented), and/or which secondary search entities are to appear in knowledge panel 222 (e.g., search entities 238, 240 may be presented based on their relationship to the Sheriff Bob search entity). In some implementations, search service 104 may simply select the highest ranked entity-action pairs or search entities for presentation in knowledge panel 222. In other implementations, search service 104 may also determine which content is to appear in knowledge panel 222 based on the results of a content auction. For example, an entity-action pair may receive a lower ranking if its winning bids are lower than for other entity-action pairs or may receive a higher ranking if its winning bids are higher than for other entity-action pairs. In some cases, an entity-action pair may lose its ranking if its content auction bids are below a reserve auction price used by search service 104.

Search service 104 may vary the visual layout of knowledge panel 222 to emphasize higher ranked content and deemphasize lower ranked content. In various implementations, search service 104 may emphasize a secondary search entity or third-party content associated with a highly ranked entity-action pair by positioning the content towards the top of knowledge panel 222 (e.g., towards the top of search result screen 200), using a larger font than other content in knowledge panel 222, including an icon or graphic with the content, adding a highlighting to the content, or using any other visual means to draw a user's attention towards the third-party content. In further implementations, search service 104 may deemphasize a secondary search entity or third-party content associated with a lower ranked entity-action pair by positioning the content towards the bottom of knowledge panel 222 (e.g., further towards the bottom of search result screen 200), using a smaller font than other content in knowledge panel 222, removing an icon or graphic from the content, or using any other visual means to deemphasize the content on search result screen 200.

Figure 3:
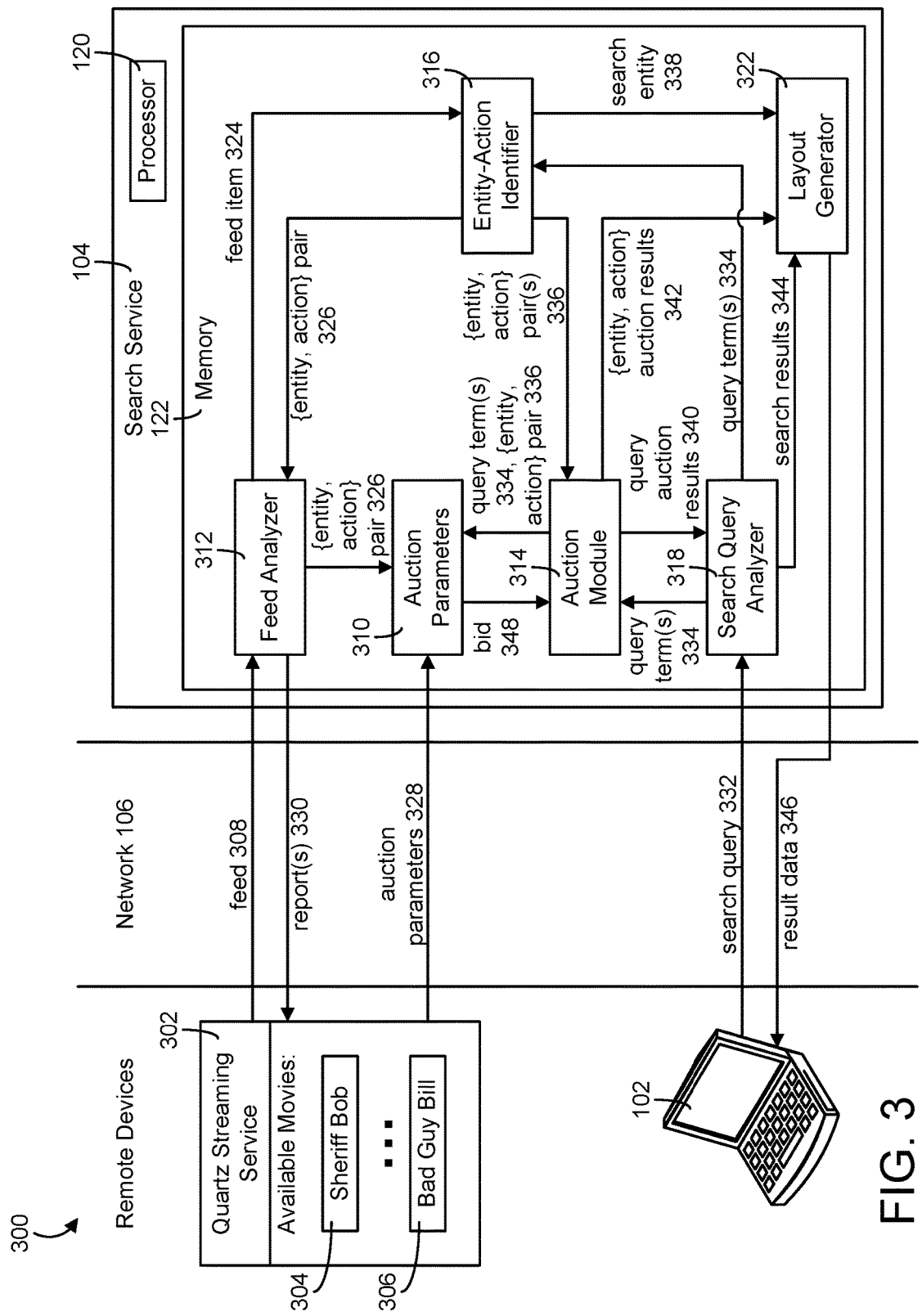
FIG. 3 illustrates an example diagram of the system of FIG. 1A using a feed to select third-party content for a search entity.

Referring now to FIG. 3, a detailed diagram 300 is shown of computer system 100 from FIG. 1A in greater detail, according to one example. As shown, assume that a third-party content provider operates a streaming service 302 (e.g., the Quartz Streaming Service") that communicates via network 106 with search service 104 and/or client device 102. In other implementations, service 302 may be any other form of online service configured to perform an online action relative to a search entity. For example, service 302 may be configured to allow users to make reservations (e.g., restaurant reservations, hotel reservations, transportation reservations, etc.), purchase hardcopies of media (e.g., movies, software, music, books, etc.) or other goods, purchase digital or streaming copies of media, or subscribe to an online service. Search service 104 is also shown to include various software modules 312-318 stored in memory 122 that, when executed by processor 120, cause processor 120 to perform the operations described herein.

In the example shown, assume that Quartz streaming service 302 has a catalog of streaming movies ranging from the Sheriff Bob movie 304 to the Bad Guy Bill movie 306 (e.g., a first through nth movie available for streaming via the service). Also, assume that streaming service 302 charges a flat, monthly fee for access to its streaming movie catalog. To attract new users to the service, a feed 308 may be uploaded to search service 104 containing a listing of one or more of movies 304-306 available from streaming service 302. Search service 104 may analyze each feed item in feed 308, attempt to match each feed item to an entity-action pair, and associate the identified entity-action pairs with auction parameters 328 specified by the content provider. In response to a search query 332 related to a search entity that represents one of movies 304-306, search service 104 may conduct a content auction for the corresponding entity-action pair. A link to streaming service 302 may then be included in result data 346 by search service 104 and presented in conjunction with the search entity. For example, result data 346 may include a link to streaming service 302 labeled "Stream on Quartz Streaming for $5.99/month" presented in conjunction with the "Sheriff Bob" search entity, as illustrated in FIG. 2.

According to various implementations, search service 104 includes a feed analyzer 312 configured to analyze and process a received feed, such as feed 308. Feed 308 may be a text file (e.g., a .txt file), a compressed file (e.g., a .zip file, a .gz file, a .bz2 file, etc.), a spreadsheet file (e.g., a .xls file), a file in a structured data format (e.g., a .xml file, a .json file, etc.), or any similar type of file suitable to group data fields into a feed item. Data fields in a feed item may be character delimited (e.g., comma delimited, semicolon delimited, etc.), space delimited (e.g., tab delimited), or separated in any other way. In some implementations, feed analyzer 312 may parse feed 308 according to a standardized feed format. For example, feed analyzer 312 may require feeds to include common parameters used across all feed types (e.g., movie-related feeds, song related feeds, etc.). Such common parameters may be formatted as follows:

TABLE 1

| Parameter Name | Required? | Repeated? | Description |
|---|---|---|---|
| Feed_item_ID | yes | no | An item ID that is unique across all feeds of a third-party content provider |
| type | yes | no | Feed item type (e.g., movie, album, song, book, etc.) |
| action | yes | no | [Action name (e.g., subscribe to a service, make a purchase, etc.) |
| Landing_page | yes | no | The URL of the webpage where the action can be performed |
| price | yes | no | The price to be paid by a user to perform the online action |
| Subscription_period | yes, if the action is a service subscription | no | Indicates the subscription period (e.g., daily, weekly, monthly, yearly, etc.) |

TABLE 1-continued

| Parameter Name | Required? | Repeated? | Description |
|---|---|---|---|
| Expiration_date | no | no | Indicates the final date the parameters will be used to provide third-party content |

For a feed that includes movie-related feed items such as feed 308, feed analyzer 312 may also utilize the following feed format:

TABLE 2

| Parameter Name | Required? | Repeated? | Description |
|---|---|---|---|
| Feed_item_name | yes | no | |
| type | yes | no | Allowed value: movie |
| Movie_title | yes | no | Full title of the movie (e.g., the name of the search entity) |

TABLE 2-continued

| Parameter Name | Required? | Repeated? | Description |
|---|---|---|---|
| Release_year | yes, if no ID is given | no | Year of release |
| MID 1 | no | no | Movie Identifier (e.g., a unique identifier for a movie used by one provider) |
| MID2 | no | no | Movie Identifier (e.g., a unique identifier for a movie used by a second provider) |
| . . . | | | |
| MIDN | no | no | Movie Identifier used by an nth provider. |
| action | yes | no | Allowed action for the movie (e.g., stream, subscribe to a streaming service, purchase, etc.) |
| Landing_page | yes | no | |
| price | yes | no | |
| Subscription_period | no | no | |

As shown in Table 2, the italicized parameters represent parameters that are common to feeds for other types of search entities. Using this format, one example of feed 308 is shown below:

TABLE 3

| Feed_item_ID | type | Movie_title | Release_year | MID | action | Landing_page | price |
|---|---|---|---|---|---|---|---|
| Item_0 | movie | Sheriff Bob | 2014 | A4 | Subscribe | http://a.test/242 | 5.99 USD |
| Item _1 | movie | Bad Guy Bill | 2014 | D3 | Subscribe | http://a.test/242 | 5.99 USD |

In some implementations, feed analyzer 312 may validate feed items in feed 308 to ensure that the data in feed 308 is properly formatted. For example, feed analyzer 312 may verify whether each feed item includes data for any required data field, such as the feed item type. The results of the validation may be provided by search service 104 as part of one or more reports 330 that include successful validations and/or feed items that could not be validated.

Feed analyzer 312 may provide a validated feed item 324 in feed 308 to an entity-action identifier 316, which is configured to identify a search entity and/or entity-action pair in feed item 324. Entity-action identifier 316 may, in some cases, identify a search entity based on a unique identifier included in feed item 324 (e.g., a unique movie identifier), if one is included. In some implementations, entity-action identifier 316 may utilize heuristics on feed item 324 to search a knowledge graph for a matching search entity. A knowledge graph generally refers to a structured graph used in semantic searching where each node in the graph represents a unique search entity and links between entities represent the relationships between them. Each node may also include any number of facts for a search entity. For example, a node for the "Sheriff Bob" movie may include facts about the movie, such as its release date, list of characters, list of actors, or the like. Entity-action identifier 316 may search the knowledge graph by comparing facts and relationships for different search entity nodes to the data in feed item 324 to identify a matching search entity. In further implementations, feed analyzer 312 may use a machine learning model on feed item 324 to identify a search entity. Such a model may, for example, analyze the search entities matched using a heuristic search of a knowledge graph, match corrections supplied by third-party content providers, analyze vertical information associated with campaigns, or the like, to identify the most likely search entity corresponding to feed item 324.

In some implementations, feed item 324 may explicitly include data regarding the action type. For example, feed item 324 may include data indicating that the action corresponds to subscribing to a streaming service, renting a movie via streaming, or purchasing a hardcopy of the movie. In other implementations, entity-action identifier 316 may analyze feed item 324 to determine the appropriate action (e.g., by analyzing a landing page listed in feed item 324, etc.).

Entity-action identifier 316 may provide any entity-action pair identified for a feed item to feed analyzer 312 for purposes of reporting. For example, entity-action identifier 316 may provide entity-action pair 326 to feed analyzer 312 identified from feed item 324. Entity-action identifier 316 may also provide an indication to feed analyzer 312 if no search entities are found for a particular feed item or if the feed item matches multiple search entities. Feed analyzer 312 may use the information received from entity-action identifier 316 to generate reports 330 that indicate successfully matched feed items and/or feed items in which an error occurred during the matching process (e.g., the feed item could not be uniquely matched to a search entity by entity-action identifier 316).

Search service 104 may associate any identified entity-action pairs from feed 308 with auction parameters 328 and store this data as auction parameters 310. In some cases, the received auction parameters 328 include bidding data, scheduling data, or budget data. In other case, the received auction parameters 328 include a request to associate feed 308 with an existing campaign or content grouping in auction parameters 310. For example, auction parameters 310 may include a parameter to link any identified entity-action pairs from feed 308 to an existing campaign having previously specified bidding data. Successfully identified entity-action pairs from feed 308 may be stored in auction parameters 310 by feed analyzer 312. For example, entity-action pair 326 identified from feed item 324 may be stored in auction parameters 310 and associated with a bid amount. Thus, the operator of streaming service 302 may easily set up auction parameters for entity-action pairs corresponding to some or all of movies 304-306 available from the service.

Client device 102 may send a search query 332 to search service 104, which is received by a search query analyzer 318. Search query analyzer 318 is configured to generate search results 344 based on search query 332. Search query analyzer 318 may identify the network addresses of websites or other online resources that most closely match search query 332. For example, if search query 332 is for the search terms "Sheriff Bob the Movie," search query analyzer 318 may identify network addresses 208, 214, and 220, as shown in FIG. 2.

In some implementations, search query analyzer 318 provides query terms 334 to an auction module 314 configured to conduct a content auction based on query terms 334. Some third-party content providers may specify one or more sets of keywords in auction parameters 310 that are used to control when bids are placed in the auction. Auction module 314 may compare the bid amounts to determine which third-party content is selected for presentation by client device 102. In some cases, auction module 314 may base the content selection as a function of a bid amount and a quality score associated with the content (e.g., a score that represents the likelihood that the user conducting the query will click on the content if selected). In response to conducting the auction, auction module 314 may provide query auction results 340 to search query analyzer 318. Query auction results 340 include third-party content that generally has the same or similar layout as search results 344. For example, query auction results 340 may include a sponsored link that is presented with the other search results generated by search query analyzer 318.

Search query analyzer 318 may also provide any query terms 334 in search query to entity-action identifier 316. In response, entity-action identifier 316 may identify a search entity 338 that matches or is related to query terms 334, if such an entity exists. Included in search entity 338 may be any facts associated with the search entity (e.g., the release date of a movie, trivia regarding the movie, etc.). In some cases, entity-action identifier 316 may not identify a search entity based on the received search terms. For example, a generic query that does not pertain to any particular named entity may not have a corresponding search entity. According to various implementations, entity-action identifier 316 also identifies one or more entity-action pairs 336 for search entity 338. In some implementations, entity-action identifier 316 also identifies any search entities and/or entity-action pairs related to search entity 338. For example, if search entity 338 corresponds to the Sheriff Bob movie and the singer/actor Jane Doe appears in the movie, entity-action identifier 316 may identify an entity-action pair to download a song by Jane Doe. In some implementations, entity-action identifier 316 generates a ranking of entity-action pairs based on their relationships to query terms 334. For example, an entity-action pair to stream Sheriff Bob may be closely related to a search query of "Sheriff Bob streaming," while an entity-action pair to download a song by Jane Doe may be more distally related to the search query.

Entity-action pairs 336 identified by entity-action identifier 316 may be provided to auction module 314 to conduct content auctions for the entity-action pairs. Auction module 314 may, for example, use one of the received entity-action pairs 336 to retrieve auction bids from auction parameters 310 for use in a content auction. For example, if one of entity-action pairs 336 matches entity-action pair 326 identified from feed 308, an auction bid 348 from streaming service 302 in auction parameters 310 may be used in the content auction conducted by auction module 314. Auction module 314 may compare received bids for entity-action pairs to generate auction results 342. In some cases, auction module 314 may also utilize a quality score to determine which third-party content is to be presented for a given entity-action pair. Auction results 342 may include data from feed item 324, such as a landing page (e.g., a webpage of streaming service 302), pricing information (e.g., $5.99 per month for the streaming service), and other such information. In various implementations, "fake" keywords (e.g., keywords not included in search query 332) may be used in auction parameters 310 to represent entity-action pairs and by auction module 314 to conduct content auctions for the entity-action pairs. Thus, auction module 314 may conduct content auctions for any number of sets of keywords based on a single search query 332 (e.g., a content auction for query terms 334 and one or more content auctions for fake keywords in auction parameters 310 that represent entity-action pairs).

Search service 104 may include a layout generator 322 configured to generate result data 346 in response to search service 104 receiving search query 332. Result data 346 is configured to cause a display of client device 102 to display search results 344 received by layout generator 322 from search query analyzer 318. Search results 344 may include, for example, hyperlinks to the search results or sponsored links selected by auction module 314 by conducting a content auction for query terms 334. If search query 332 is related to search entity 338 identified by entity-action identifier 316, layout generator 322 may also include search entity 338 in result data 346. Layout generator 322 may also receive auction results 342 for the content auctions conducted by auction module 314 for entity-action pairs 336. For example, layout generator 322 may receive data originating from feed item 324 that signifies that Sheriff Bob is available as part of the movie catalog of streaming service 302, which is available for $5.99/month. In some implementations, layout generator 322 arranges auction results 342 based on the ranking determined by entity-action identifier 316 and/or the bid amounts used to generate auction results 342. For example, third-party content for an identified entity-action pair may be excluded from result data 346 by layout generator 322 if the corresponding bids for that pair did not meet a reserve price. Layout generator 322 may also emphasize or deemphasize third-party content for entity-action pairs based on their relationships to search query 332. For example, third-party content that corresponds to an entity-action pair closely related to search query 332 may be visually emphasized while third-party content not as closely related to search query 332 is deemphasized.

Figure 4:
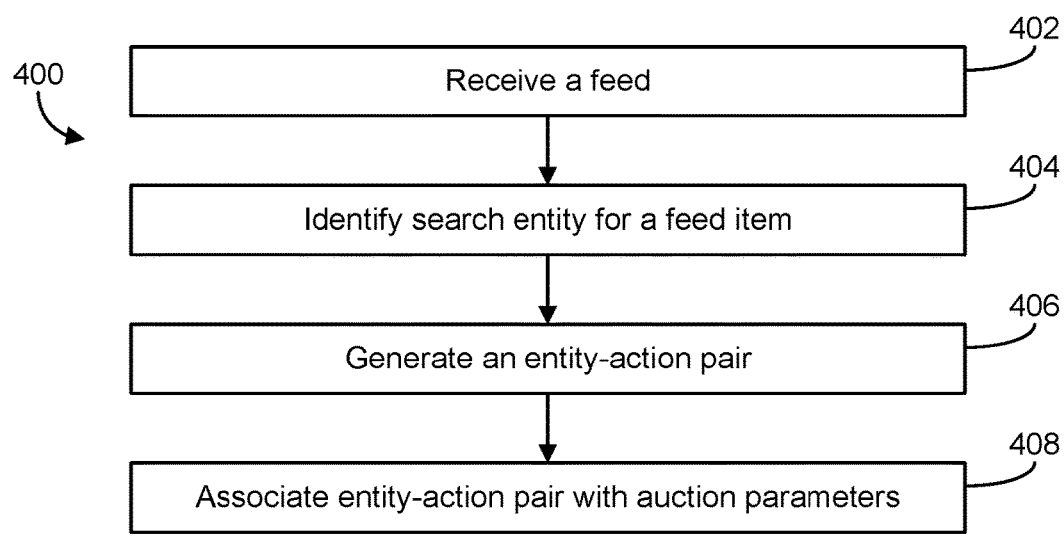
FIG. 4 illustrates an example flow diagram depicting the steps taken in one implementation of a process of using a feed to associate an entity-action pair with parameters for a content auction.

Referring now to FIG. 4, a flow diagram of a process 400 is shown for using a feed to associate an entity-action pair with parameters for a content auction, according to various implementations. As depicted in FIG. 4, a feed is received (step 402) and a search entity for a feed item is identified (step 404). An entity-action pair is generated (step 406) and associated with auction parameters (step 408). In general, process 400 allows any number of entity-action pairs to be identified and associated with auction parameters (e.g., bid amounts or the like). Process 400 may be implemented by a search service, such as search service 104 in FIG. 1A. Process 400 may also be implemented by another device or set of devices working in conjunction with a search service to select third-party content for presentation with search results.

Still referring to FIG. 4, and in more detail, process 400 includes receiving a feed (step 402). The received feed may be a file of any type suitable to distinguish data fields for a feed item. For example, the file may be a text file, an XML file, a spreadsheet, a compressed file, or the like. In general, feed items in the feed may correspond to products, services, or other online actions available via a third-party content provider. For example, a feed may include a listing of movies, e-books, songs, etc. offered by the content provider. The feed may have required information for a particular type of feed item (e.g., the title of a movie, song, book, etc.) or may have optional information that can be used to further identify a search entity for the feed item. In some implementations, the feed may be validated to ensure that its format conforms to an expected format (e.g., the data fields in the feed appear in a prescribed order, required data fields are completed, etc.).

Process 400 includes identifying a search entity for a feed item in the received feed (step 404). According to various implementations and as shown above, a feed item includes identification data, a feed item type (e.g., whether the feed item relates to a movie, book, song, etc.), and an online action. The identification data may be any data used to match the feed item to a search entity (e.g., a release date, an address, a name, etc.). In some implementations, the identification data includes a unique identifier for a particular product, service, or action. For example, a feed item for a movie may include a unique identifier for the movie used by an online database of movies. The unique identifier may be matched to a search entity associated with the identifier, to identify the search entity. According to various implementations, the identification data in the feed item may be used to heuristically search a knowledge graph having search entities as nodes and relationships between search entities as paths between nodes. For example, the node for Sheriff Bob the movie may be linked to the node for John Doe the actor, since John Doe starred in Sheriff Bob. Potential errors associated with step 404 include not being able to identify any search entities and identifying more than one search entity. For example, a typographical error in the feed item may cause a search entity not to be matched to the feed item. In another example, assume that the Sheriff Bob movie was originally released in 1965 and that a digitally remastered version was released in 2014. If the feed item does not include any information to distinguish between these two, corresponding search entities for both versions of the movie may match the feed item.

Process 400 includes generating an entity-action pair for the feed item (step 406). An entity-action pair may be generated by associating an online action with the search entity identified in step 404. In some implementations, the online action may be explicitly specified by a third-party content provider. For example, the type of online action may be included in a feed item or associated with the received feed. In other words, the type of online action may be included as an actual data field in the feed item or may be included in data associated with the feed item (e.g., as part of a separately uploaded file, as part of a campaign linked to the feed, as part of a header of the feed, etc.). In other implementations, the online action may be inferred from the feed item. For example, assume that the feed item indicates a particular movie and a network address of a streaming service that charges a monthly subscription fee. In such a case, an online action of subscribing to the streaming service may be associated with the search entity for the movie without the action being explicitly specified by the content provider.

Process 400 includes associating the entity-action pair with auction parameters (step 408). Once an entity-action pair has been identified from a feed item, the pair may be associated with parameters used to control bidding in a content auction. In some implementations, the parameters may be associated with an existing campaign or other grouping. For example, an campaign may include parameters that control when and how much is bid by a third-party content provider for the entity-action pair. In further implementations, the auction parameters may be received in conjunction with the feed or at a later time. For example, a bid amount may be specified when the feed is uploaded or included as part of the feed or a feed item.

Figure 5:
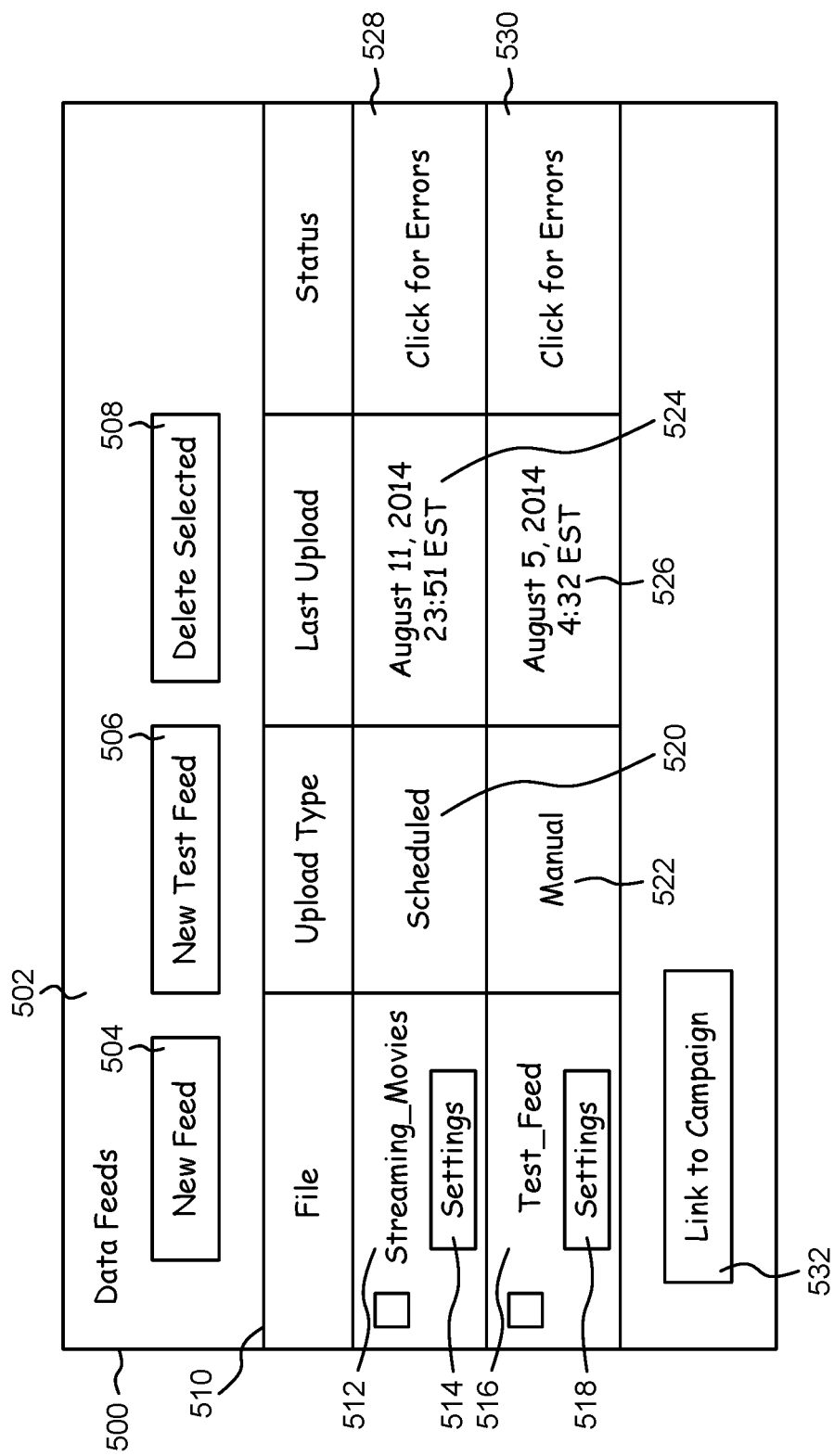
FIG. 5 illustrates an example illustration of one implementation of an electronic display showing an interface screen to manage search entity related feeds.

Referring now to FIG. 5, an example illustration is shown of an electronic display 500 showing an interface screen 502 to manage search entity related feeds. Electronic display 500 may be part of any electronic device operated by a third-party content provider or an agent thereof (e.g., an marketing agency). Screen 502 may be generated by a search service and provided to the electronic device for display by display 500. For example, search service 104 in FIG. 1A may provide screen 502 to the electronic device via network 106. As shown, screen 502 is generally configured to allow a third-party content provider to manage and test feeds for use with content auctions for entity-action pairs.

Screen 502 may include various inputs configured to create or delete feeds. For example, screen 502 may include an input 504 configured to create a new feed. Data regarding a new feed may be entered via a pop-up window or on another screen (not shown). Examples of data that may be entered for a new feed may include the file type of the feed, the location of the feed, when the feed should be re-uploaded, or the format for feed items in the feed. Similar to input 504, screen 502 may include an input 506 configured to allow a test feed to be uploaded. In some cases, a test feed may be used by a content provider to validate whether or not the feed conforms to the format used by the search service. Screen 502 may also include an input 508 configured to delete any of the existing feeds. For example, selection of feed 512 and input 508 may delete feed 512.

Screen 502 may include a portion 510 that includes information regarding existing feeds. In some implementations, the name of the file of a feed may be displayed. For example, feeds 512, 516 may be displayed on screen 502 if they had previously been uploaded. For each uploaded feed, screen 502 may include inputs 514, 518 configured to allow settings for a feed to be modified. Example feed settings may correspond to settings that allow a feed to be activated or placed in a hold state, settings that control the location of the file of the feed, and settings that control how often a feed is refreshed, if ever.

Screen portion 510 may include various data regarding feeds 512, 516. In some cases, screen 502 includes an upload type for each of feeds 512, 516. For example, status 520 may indicate that feed 512 is scheduled to be updated periodically. In another example, status 522 may indicate that feed 516 is only updated manually (e.g., in response to a request to update the feed). Screen portion 510 may also include timestamps 524, 526 for their corresponding feeds to indicate the last time the feeds were updated.

According to various implementations, the system may be configured to validate uploaded feeds. For example, the system may validate that feed items comply with the formatting rules of the system. The system may also determine whether or not a search entity is successfully matched to each feed item in a feed. As shown, feeds 512, 516 may have corresponding statuses 528, 530 that indicates that errors were encountered during the validation. Selection of status 528 may, in some cases, cause screen 502 to navigate to a reporting screen for feed 512. According to various implementations, the system may be configured to allow a content provider to proceed with errors or may prevent the use of a feed until all errors are corrected. For example, a feed having ten thousand items and a single error may still be used for purposes of selecting content based on the 9,999 correct feed items.

Screen 502 may include an input 532 configured to link a selected feed 512, 516 to an existing campaign. The campaign may include auction parameters, such as bidding information, budgetary constraints, timing information (e.g., when bids are to be placed), or other parameters that control when and how bids are placed on behalf of the third-party content provider. For example, other auction parameters may control the types of devices to which the third-party content is presented (e.g., desktop computers, mobile devices, etc.). In another example, some auction parameters may control whether or not a bid is placed based on the geographic location of the client device (e.g., the third-party content is only provided to devices located in the U.S., devices located in a given city or zip code, etc.). By linking a feed to a campaign, a campaign may have any number of entity-action pairs associated with it. Thus, the provider's content may appear across tens of thousands of different search queries or more. For example, a single bid amount defined in the campaign may be used to place bids in auctions whenever a search query relates to one of the streaming movies listed in a feed (e.g., a link to the provider's streaming service may be presented if a user searches for the movie "Sheriff Bob," the movie "Bad Guy Bill," the actor "John Doe," etc.).

Referring now to FIG. 6, an example illustration is shown of electronic display 500 showing errors identified in a search entity related feed. Continuing the example of FIG. 5, a screen 602 may be provided to display 500 that reports on any errors detected during a feed upload. Screen 602 may be displayed, for example, in response to status 528 shown in FIG. 5 being clicked or otherwise selected. In further implementations, different interface screens may be developed to perform the functions described with regard to screens 502, 602.

Assume that feed 512 shown in FIG. 5 has several thousand feed items, each feed item corresponding to a streaming movie in a third-party provider's catalog. One or more levels of validation may be performed on the feed items to ensure that a successful match between a feed item and an entity-action pair has occurred. As shown, screen 602 may display a first type of error 604 that corresponds to a feed item not matching any search entities. Error 604 may include information such as a feed item identifier 606 and/or a line number 608 in the feed. For example, three entries in the feed may not be matched to a search entity. Potential causes for an unmatched feed item may include, but are not limited to, a corresponding search entity not existing and typographical errors in the feed item (e.g., a misspelled title, an incorrect release year, etc.). In some implementations, screen 602 includes a suggested correction 616 for error 604. For example, the chance of a feed item for a movie matching a search entity may increase if a unique movie identifier is used in the feed item.

Screen 602 may include data regarding another type of error 610 that corresponds to multiple search entities matching a feed item. Similar to error 604, error 610 may include information such as a feed item identifier 612 and/or a line number 614 in the feed. For example, the sixty sixth feed item in the feed may match multiple search entities. Multiple search entities may match a single feed item for a variety of reasons. For example, there may be two e-books that have the same title and were released in the same year. If a feed item only specifies a book title and release year, the feed item may be matched to search entities that correspond to both books. In another example, assume that a particular restaurant has two locations in the same city and that a feed is uploaded to allow users to make reservations at a particular restaurant. If a feed item does not differentiate between the two restaurants, the feed item may match search entities corresponding to both restaurants. Similar to error 604, a suggested correction 618 may be included on screen 602. For example, suggested correction 618 may suggest that the additional information be included in the feed item, to help differentiate between the matching search entities (e.g., including a movie identifier in the feed item for a movie, including a USBN in a feed item for a book, including a location number or address in a feed item for a restaurant or business, etc.).

Other types of errors may also be displayed on screen 602 depending on the level of validation performed on the feed. In some implementations, a feed item or the feed itself may be validated to ensure that it conforms to a predefined format. For example, data fields in a feed item may be required to appear in a particular order in the feed. In another example, data fields in the feed may be required to be delimited using a special character (e.g., a comma, a semicolon, etc.). In yet another example, the type of file used in the feed may be validated to ensure that a supported file type is used. For example, the system may require that the feed be a .xml file before proceeding to analyze the feed. Formatting related errors may be displayed as a whole for the feed (e.g., if the entire feed does not conform to a supported format or file type) or on a per feed item basis (e.g., if a particular feed item is missing a required data field).

Figure 7:
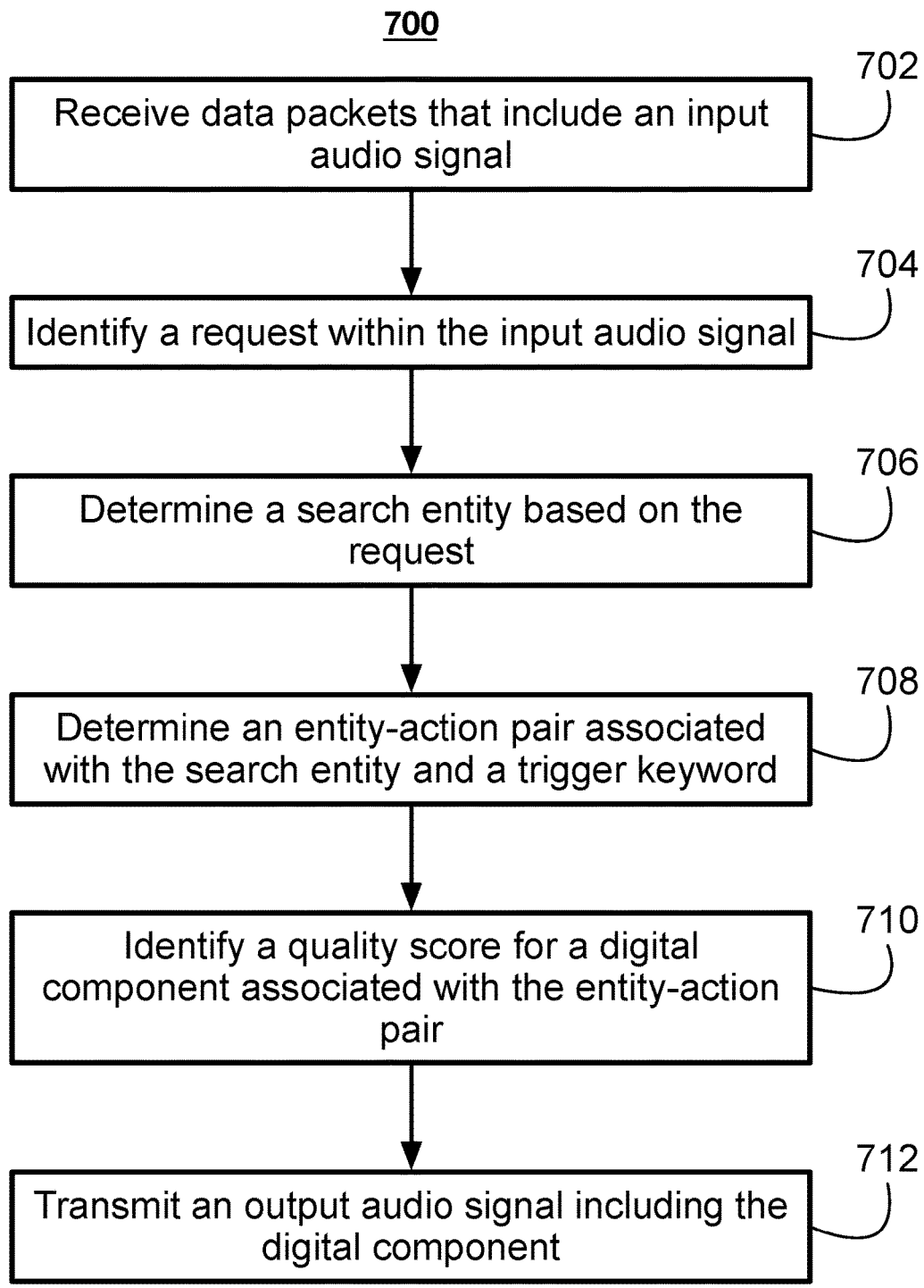
FIG. 7 illustrates block diagram of an example method of data transmission in a voice activated computer network.

FIG. 7 illustrates a block diagram of a method 700 of data transmission in a voice activated computer network. The method 700 can include receiving data packets that include an input audio signal (ACT 702). The method 700 can include identifying a request within the input audio signal (ACT 704). The method 700 can include determining a search result and a search entity based on the request (ACT 706). The method 700 can include determining an entity-action pair associated with the search entity and trigger keyword (ACT 708). The method 700 can include identifying a quality score of a digital component associated with the entity-action pair (ACT 710). The method 700 can include transmitting an output audio signal that includes the digital component responsive to the quality score being above a predetermined threshold (ACT 712).

The method 700 can include receiving data packets that include an input audio signal (ACT 702). The input audio signal can be detected by a sensor of a client computing device and can be transmitted to a data processing system by the client computing device. For example, a natural language processor component executed by the data processing system can receive the input audio signal from a client computing device via an interface of the data processing system. In some implementations, the data processing system can receive, via the interface, data packets that can include a second input audio signal. The second input audio signal can originate from the same client computing device or a different client computing device that transmitted the first input audio signal to the data processing system.

The data processing system can identify a second request in the second input audio signal. The second input audio signal can include a second keyword. In some implementations, the second request does not include a second trigger keyword. When the second request does not include a second trigger keyword, the data processing system can use the trigger keyword from the first request. In other implementations, the data processing system can select which trigger keyword to use in association with the second request by ranking a plurality of candidate trigger keywords associated with the second keyword. The data processing system can then select the trigger keyword as the highest ranked of the candidate trigger keywords. In some implementations, when the data packets are received by the data processing system, the data processing system can establish a communication session between the client computing device and route the data packets of the communication session between the client computing device and the third-party provider device.

The method 700 can include identifying a request within the input audio signal (ACT 704). The request can include one or more search keywords and a trigger keyword. The data processing system can receive data packets that carry or include the input audio signal detected by a sensor of the client computing device (or client device). A natural language processor component of the data processing system can receive the data packets that include the input audio signal. The natural language processor component can parse the input audio signal into one or more search keywords and a trigger keyword. For example, the audio signal detected by the client device can include "Okay device, I need a ride from Taxi Service Company A to go to 1234 Main Street." In this audio signal, the initial trigger keyword can include "okay device", which can indicate to the client device to transmit an input audio signal to the data processing system. A pre-processor of the client device can filter out the terms "okay device" prior to sending the remaining audio signal to the data processing system. In some cases, the client device can filter out additional terms or generate keywords to transmit to the data processing system for further processing.

The data processing system can identify a trigger keyword in the input audio signal. The trigger keyword can include, for example, "to go to" or "ride" or variations of these terms. The trigger keyword can indicate a type of service or product. The data processing system can identify a request in the input audio signal. The request can be determined based on the terms "I need". The trigger keyword and request can be determined using a semantic processing technique or other natural language processing technique. In some implementations, when the trigger keyword is selected, the data processing system can select, from a database, a template based on the trigger keyword. The data processing system can identify the different fields within the template and populate the fields. The fields can be populated with data or values received from the client computing device corresponding to the field in the template. The populated template can be or can be used to generate the entity-action pair.

The method 700 can include determining a search entity based on the request (ACT 706). The search entity can be based on the one or more keywords included in the request. The search entity can be an indication of the search concept underlying the request. For example, the input audio signals of "Ok, what time is the movie playing tonight" and "OK, what restaurants have open reservations tonight" can return different search results, but can have similar search entities—searching for events that occur tonight. The search entity can include identification data, an item type (e.g., whether the item relates to a movie, book, song, etc.), and an action. The identification data may be any data used to match an action item to the search entity (e.g., movie times, release dates, an address, a name, etc.). In some implementations, the identification data includes a unique identifier for a particular product, service, or action that is provided by the service provider device. For example, an action item for a movie may include a unique identifier for the movie used by an online database of movies. The unique identifier may be matched to a search entity associated with the identifier, to identify the search entity. According to various implementations, the identification data in the action item may be used to heuristically search a knowledge graph having search entities as nodes and relationships between search entities as paths between nodes. The data processing system can generate, by a direct action application programming interface, a first action data structure that can include the entity-action pair.

The method 700 can include determining an entity-action pair associated with the search result (ACT 708). The entity-action pair can be associated with the search entity and the trigger keyword. The action of the entity-action pair can include an action that is performed regarding the search entity. In some implementations, the online action may be explicitly specified by a third-party content provider (e.g., the content source device or the service provider device). In other implementations, the online action may be inferred from the search entity. For example, if the search entity is the find open restaurant reservations, the inferred online action could be to arrange transportation to the restaurant.

In some implementations, the method 700 can include determining a plurality of entity-action pairs associated with the search entity and the trigger keyword. For example, for the search entity of finding an open restaurant reservation, actions could include reserving an open reservation time, arranging transportation to the restaurant, providing reviews of the restaurant, providing an identification of points of interest near the restaurant. An entity-action pair can be generated for each of the possible actions.

In some implementations, the method 700 can also include other search entities that are related to the first search entity. For example, the search entity for information about a movie can be related to a search entity for information about an actor in the movie. Determining if the search entities are related can include performing a lookup in a log storing the occurrence of each search entity. The data processing system can identify the number of times the first search entity was requested and the number of times the second search entity was requested. The data processing system can determine the number of times the request for the first search entity and the second search entity originated from the same source. If the number of times the request for the first search entity and the second search entity originated from the same source occur more than a predetermined number of times, the data processing system can determine that the two search entities are related. In some implementations, the request for the first search entity and the request for the second search entity are counted as originating from the same source if the requests originate within a single session or within a predetermined amount of time of one another. The first search entity can be determined to be related to the second search entity if the number of times the search for the second search entity and the search for the first search entity originated from the same source is above the predetermined threshold. In some implementations, the entity-action pair can be transmitted to a third-party provider device to cause the third-party provider device to invoke a conversational application programming interface configured for the third-party provider device.

The method 700 can include identifying a quality score of a digital component associated with the entity-action pair (ACT 710). In some implementations, multiple digital components can be selected and multiple entity-action pairs can be identified. In these implementations, a quality score can be calculated for each of the digital components. The method 700 can also include clustering the plurality of entity-action pairs into groups of entity-action pairs based on each action of the plurality of entity-action pairs. The groups of entity-action pairs can be ranked. For example, multiple entity-action pairs related to providing a car service in response to an input audio signal. Each of the entity-action pairs for providing a car service can be grouped together and ranked, for example, how closely related the keywords in the input audio signal are related to each of the entity-action pairs. In some implementations, the ranking can be based on the relationship between the trigger keyword and the entity-action pair. For example, the trigger keyword "buy" in "OK, buy movie tickets" is more closely related to an entity-action pair to buy movie tickets than an entity-action pair that provides a listing of movie times. The data processing system provide multiple digital components. For example, the data processing system can select an entity-action pair from each of the entity-action pair groupings and then select a digital component for each of the selected entity-action pairs. In other implementations, each of the groups are ranked, and the data processing system can select an entity-action pair from the highest ranked group of entity-action pairs. The digital component can be selected, based on the trigger keyword, via a real-time content selection process. The digital component provided by a content provider device.

The method 700 can include transmitting an output audio signal that includes the digital component (ACT 712). In some implementations, the digital component is included in the output audio signal if the quality score of the digital component is above a predetermined threshold. In some implementations, the data processing system can transmit, via the direct action application programming interface, an action data structure to a third-party provider device to cause the third-party provider device to invoke a conversational application programming interface and establish a communication session between the third-party provider device and the client computing device. The action data structure can include the digital component or entity-action pair. The action data structure can also include additional information, such as, numerical values, character strings, Unicode values, Boolean logic, binary values, hexadecimal values, identifiers, location coordinates, geographic areas, timestamps, or other values. The action data structure can be generated responsive to a template associated with the third-party provider device or the entity-action pair. The third-party device can parse or process the received action data structure and determine to invoke a conversational API and establish a communication session between the third-party provider device and the client device. The service provider device can determine to invoke or otherwise execute or utilize the conversational API based on the contents of the action data structure. For example, the service provider device can determine that additional information can facilitate performing an operation corresponding to the action data structure. The service provider device can determine that communicating with the client computing device can improve a level of service or reduce resource utilization due to erroneous performance of the operation. The service provider device can determine to customize the operation for the client computing device by obtaining additional information.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system for transmission of packetized data in a voice activated computer network environment, the system comprising a data processing system having a processor and a memory to:
   receive, via an interface, an input audio signal detected by a microphone of a client computing device;
   identify a first search query within the input audio signal detected by the microphone of the client computing device;
   identify a first search entity based on the first search query;
   determine a first entity-action pair associated with the first search entity and an action of the first entity-action pair comprising a first action performed regarding the first search entity and determine a second entity-action pair associated with the first search entity and an action of the second entity-action pair comprising a second action, different than the first action, performed regarding the first search entity;
   select a first content item associated with the first entity-action pair based on a first quality score and a second content item associated with the second entity-action pair based on a second quality score; and
   transmit, to the client computing device, an output audio signal comprising the first content item based on a ranking of the first entity-action pair and the second entity-action pair.

2. The system of claim 1, further comprising the data processing system to:
   determine a plurality of entity-action pairs associated with the first search query;
   cluster the plurality of entity-action pairs into a first group of entity-action pairs and a second group of entity-action pairs based on each action of the plurality of entity-action pairs;
   rank, within the first group of entity-action pairs and the second group of entity-action pairs, the plurality of entity-action pairs; and
   select, based on the ranking of the plurality of entity-action pairs, the first entity-action pair from the first group of entity-action pairs and the second entity-action pair from the second group of entity-action pairs.

3. The system of claim 1, comprising the processor and the memory to:
   determine a number of times a search for a second search entity and a search for the first search entity originated from a same source;
   compare the number of times the search for the second search entity and the search for the first search entity originated from the same source to a predetermined threshold; and
   determine the first search entity is related to the second search entity responsive to the number of times the search for the second search entity and the search for the first search entity originated from the same source being above the predetermined threshold.

4. The system of claim 1, further comprising the data processing system to:
   receive, via the interface, a second input audio signal detected by the microphone of the client computing device;
   identify a second request comprising a second query term and not comprising a second trigger keyword within the second input audio signal detected by the microphone of the client computing device;
   determine a second search entity based on the second query term;

rank a plurality of trigger keywords associated with the second query term; and identify the second trigger keyword from the ranked plurality of trigger keywords.

5. The system of claim 1, further comprising:

a natural language processor component executed by the processor to receive, via an interface, data packets comprising the input audio signal;

a natural language processor component to parse the input audio signal into the first search query;

a direction action application programming interface to generate a first action data structure comprising the first entity-action pair.

6. The system of claim 5, further comprising the direction action application programming interface to:

transmit the first action data structure to a third-party provider device to cause the third-party provider device to invoke a conversational application programming interface and establish a communication session between the third-party provider device and the client computing device.

7. The system of claim 5, further comprising the data processing system to:

select, from a database, a template based on the first search query;

identify a field in the template;

receive a value from the client computing device corresponding to the field in the template; and populate the field in the template with the value received from the client computing device to generate the first entity-action pair.

8. The system of claim 1, further comprising:

a content selector component to receive the first search query identified by a natural language processor and select, based on the first search query, the first content item via a real-time content selection process, the first content item provided by a content provider device.

9. The system of claim 1, comprising the processor and memory to:

transmit the first entity-action pair to a third-party provider device to cause the third-party provider device to invoke a conversational application programming interface configured for the third-party provider device.

10. The system of claim 9, comprising the processor and memory to:

route data packets of a communication session between the client computing device and the third-party provider device.

11. A method of data transmission in a voice activated computer network environment, comprising:

receiving, via an interface, an input audio signal detected by a microphone of a client computing device;

identifying a first search query within the input audio signal detected by the microphone of the client computing device;

determining a first search entity based on the first search query;

determining a first entity-action pair associated with the first search entity and an action of the first entity-action pair comprising a first action performed regarding the first search entity; and determine a second entity-action pair associated with the first search entity and an action of the second entity-action pair comprising a second action, different than the first action, performed regarding the first search entity;

selecting a first content item associated with the first entity-action pair based on a first quality score and a second content item associated with the second entity-action pair based on a second quality score; and transmitting, to the client computing device, an output audio signal comprising the first content item based on a ranking of the first entity-action pair and the second entity-action pair.

12. The method of claim 11, further comprising:

determining a plurality of entity-action pairs associated with the first search query;

clustering the plurality of entity-action pairs into groups of entity-action pairs based on each action of the plurality of entity-action pairs;

ranking, within each of the groups of entity-action pairs, the plurality of entity-action pairs; and selecting, from each of the groups of entity-action pairs and based on the ranking of the plurality of entity-action pairs, a candidate entity-action pair.

13. The method of claim 11, further comprising:

determining a number of times a search for a second search entity and a search for the first search entity originated from a same source;

comparing the number of times the search for the second search entity and the search for the first search entity originated from the same source to a predetermined threshold; and determining the first search entity is related to the second search entity responsive to the number of times the search for the second search entity and the search for the first search entity originated from the same source being above the predetermined threshold.

14. The method of claim 11, further comprising:

receiving, via the interface, a second input audio signal detected by the microphone of the client computing device;

identifying a second request comprising a second query term and not comprising a second trigger keyword within the second input audio signal detected by the microphone of the client computing device;

determining a second search entity based on the second query term;

ranking a plurality of trigger keywords associated with the second query term; and identifying the second trigger keyword from the ranked plurality of trigger keywords.

15. The method of claim 11, further comprising:

receiving, by a natural language processor component, data packets comprising the input audio signal;

parsing, by a natural language processor component, the input audio signal into the first search query; and generating, by a direct action application programming interface, a first action data structure comprising the first entity-action pair.

16. The method of claim 15, further comprising:

transmitting, by the direct action application programming interface, the first action data structure to a third party provider device to cause the third party provider device to invoke a conversational application programming interface and establish a communication session between the third party provider device and the client computing device.

17. The method of claim 15, further comprising:

selecting, from a database, a template based on the first search query;

identifying a field in the template;

receiving a value from the client computing device corresponding to the field in the template; and populating the field in the template with the value received from the client computing device to generate the first entity-action pair.

18. The method of claim 15, comprising:

receiving, by a content selector component, the first search query identified by a natural language processor; and selecting, based on the first search query, the first content item via a real-time content selection process, the first content item provided by a content provider device.

19. The method of claim 11, further comprising:

transmitting the first entity-action pair to a third-party provider device to cause a third party provider device to invoke a conversational application programming interface configured for the third party provider device.

20. The method of claim 19, further comprising:

routing data packets of a communication session between the client computing device and the third party provider device.

* * * * *